United States Patent
Oddsen, Jr.

(10) Patent No.: US 7,331,551 B2
(45) Date of Patent: Feb. 19, 2008

(54) MULTIPLE ELECTRONIC DEVICE REORIENTING SUPPORT

(75) Inventor: Odd N. Oddsen, Jr., Easton, PA (US)

(73) Assignee: Innovative Office Products, Inc., Easton, PA (US)

( * ) Notice: Subject to any disclaimer, the term of this patent is extended or adjusted under 35 U.S.C. 154(b) by 0 days.

(21) Appl. No.: 10/417,710

(22) Filed: Apr. 17, 2003

(65) Prior Publication Data

US 2004/0011938 A1 Jan. 22, 2004

Related U.S. Application Data

(60) Provisional application No. 60/442,015, filed on Jan. 23, 2003, provisional application No. 60/375,177, filed on Apr. 24, 2002.

(51) Int. Cl.
*E04G 3/00* (2006.01)

(52) U.S. Cl. ............... 248/279.1; 248/278.1; 248/917; 248/919; 361/683

(58) Field of Classification Search ........ 248/917–924, 248/371, 393, 276.1, 121, 127, 122.1, 125.9, 248/229.13, 229.14, 279.1; 361/681, 682; 349/58
See application file for complete search history.

(56) References Cited

U.S. PATENT DOCUMENTS

| | | | | |
|---|---|---|---|---|
| 3,095,834 A | * | 7/1963 | Killen | 108/15 |
| 4,733,618 A | * | 3/1988 | Sarro et al. | 108/140 |
| 4,880,270 A | * | 11/1989 | Cooper | 297/188.21 |
| 5,007,608 A | | 4/1991 | Carroll, Jr. | |
| 5,321,579 A | | 6/1994 | Brown et al. | |
| 5,687,939 A | | 11/1997 | Miscovitch | |
| 5,904,328 A | * | 5/1999 | Leveridge et al. | 248/124.1 |
| 6,061,104 A | | 5/2000 | Evanicky et al. | |
| RE36,978 E | | 12/2000 | Moscovitch | |
| 6,343,006 B1 | * | 1/2002 | Moscovitch et al. | 361/681 |
| 6,394,403 B1 | * | 5/2002 | Hung | 248/276.1 |
| 6,409,134 B1 | | 6/2002 | Oddsen, Jr. | |
| 6,418,010 B1 | | 7/2002 | Sawyer | |
| 6,478,274 B1 | | 11/2002 | Oddsen, Jr. | |
| 6,478,275 B1 | * | 11/2002 | Huang | 248/284.1 |
| 6,505,988 B1 | | 1/2003 | Oddsen, Jr. | |
| 6,712,321 B1 | * | 3/2004 | Su et al. | 248/123.11 |
| 2003/0075653 A1 | * | 4/2003 | Li | 248/274.1 |
| 2003/0112385 A1 | * | 6/2003 | Okamoto | 349/58 |
| 2003/0132356 A1 | * | 7/2003 | Copeland | 248/282.1 |
| 2003/0231460 A1 | * | 12/2003 | Moscovitch | 361/681 |

FOREIGN PATENT DOCUMENTS

WO WO-02/42681 A 5/2002

OTHER PUBLICATIONS

Supplementary European Search Report, EP 03 72 4082, Dated Jun. 20, 2006.

* cited by examiner

*Primary Examiner*—Amy J. Sterling
(74) *Attorney, Agent, or Firm*—Lerner, David, Littenberg, Krumholz & Mentlik, LLP

(57) ABSTRACT

An apparatus for a plurality of electronic devices is adapted for positioning the electronic devices in a plurality of orientations. A swivel arm is pivotably coupled to a support arm for rotation through a plurality of orientations. The electronic devices are coupled to the swivel arm by an assembly which accommodates manipulation of the electronic device along the swivel arm, as well as rotation and tilting.

41 Claims, 29 Drawing Sheets

FIG. 4
FIG. 5
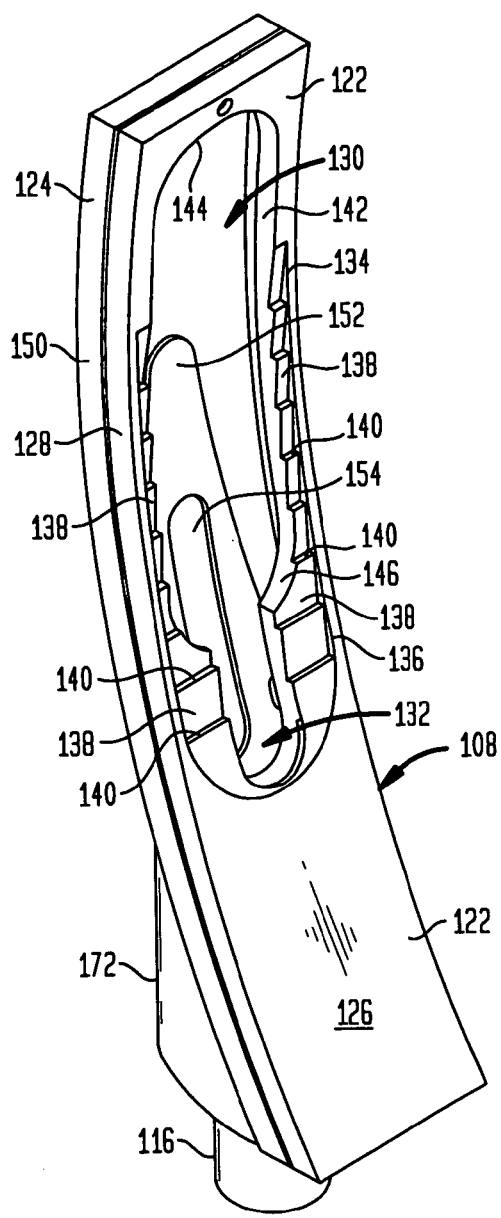
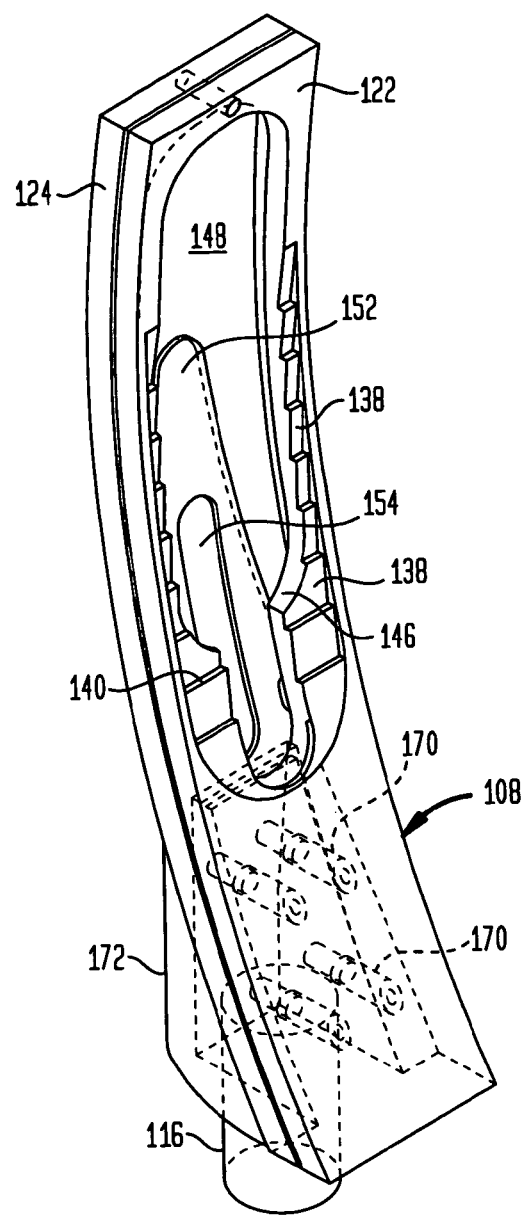

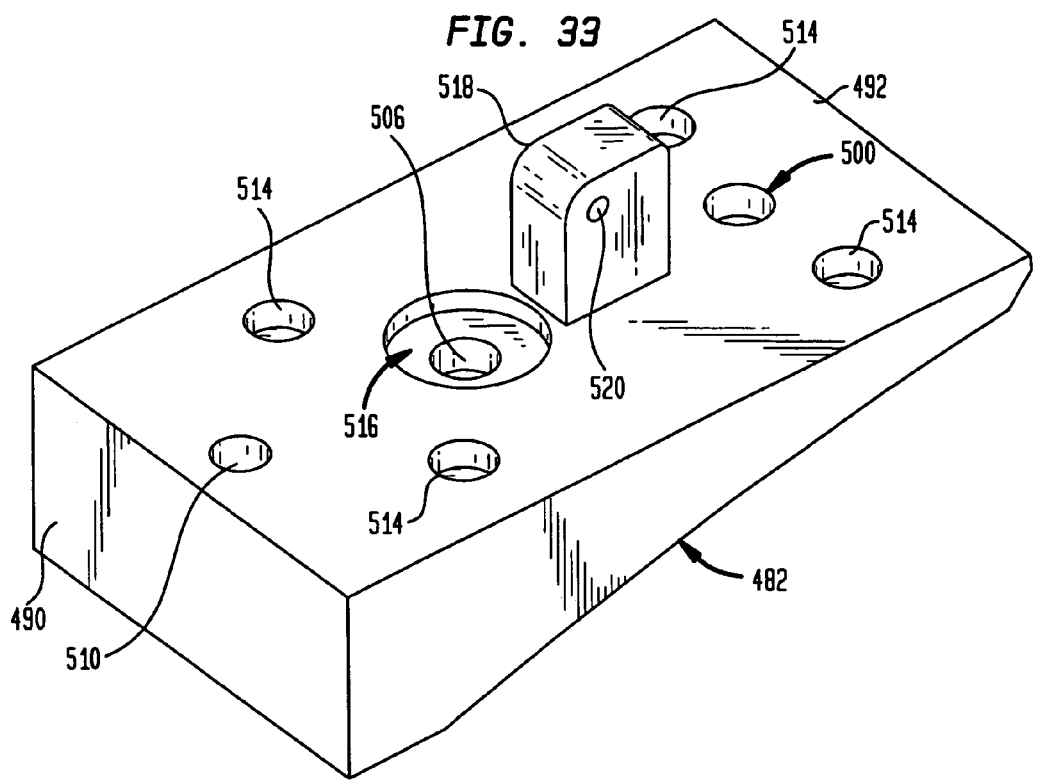
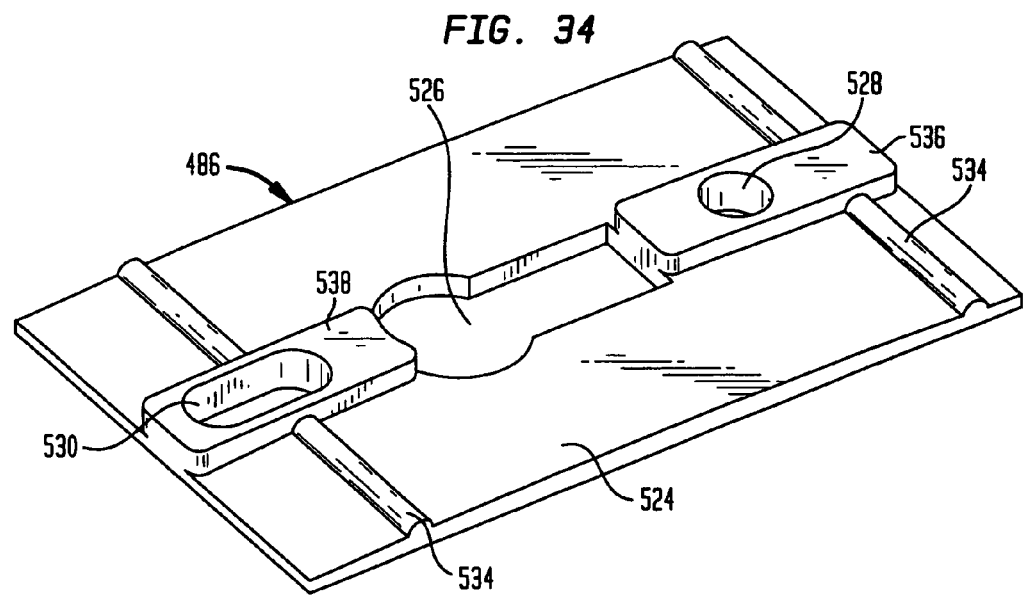

MULTIPLE ELECTRONIC DEVICE REORIENTING SUPPORT

CROSS REFERENCES TO RELATED APPLICATIONS

The present application claims the benefit of U.S. Provisional Application No. 60/375,177, filed Apr. 24, 2002, and U.S. Provisional Application No. 60/442,015, filed Jan. 23, 2003, both entitled "Multiple Electronic Device Reorienting Support", the disclosures of which are incorporated herein by reference.

BACKGROUND OF THE INVENTION

The present invention relates in general to electronic device support systems, and more particularly, to a support system adapted for reorienting multiple electronic devices, and more specifically, flat screen displays.

Flat screen displays are mounted to an articulating support arm which enables positioning of the display in various positions about three axes. The typical arrangement is the mounting of a single flat screen display to a single articulating support arm. However, in certain applications, it is desirable to provide multiple flat screen displays for viewing at the same location, each of which can be independently adjusted to obtain proper viewing.

There are known double flat screen display pole mounts which are adapted for supporting a pair of flat screen displays. The flat screen displays may be attached to the pole using a variety of mounting brackets, tilt assemblies or articulating arms. The flat screen displays can be mounted either one above the other in a vertical orientation or side by side in a horizontal orientation. Pole mounting systems of the aforementioned type are available from Innovative Office Products of Easton, Pa.

Notwithstanding the existence of multiple flat panel display pole mounting systems, there is the desire for further improvements in such systems to which the present invention is directed.

SUMMARY OF THE INVENTION

In accordance with one embodiment of the present invention there is disclosed a support for a plurality of electronic devices, the support adapted for positioning the electronic devices in a plurality of orientations, the support comprising a base; an elongated first member having first and second spaced apart ends, the first end of the first member coupled to the base whereby the first member is arranged in a vertical orientation; an elongated second member having first and second spaced apart ends pivotably coupled therebetween to the first member at a pivot point, the second member rotatable about the pivot point between a vertical and a horizontal orientation, the second member moveable in a vertical direction along a portion of the first member when at least in the horizontal orientation; first and second coupling assemblies attached to the second member each adapted for securing an electronic device thereto, each of the first and second coupling assemblies moveable along a porportion of the second member between the pivot point and an adjacent first and second end of the second member.

In accordance with another embodiment of the present invention there is disclosed a support for a plurality of flat screen displays, the support adapted for positioning the displays in a plurality of orientations, the support comprising a base; an elongated stand arm having first and second spaced apart ends, the first end coupled to the base with the stand arm arranged in a vertical orientation, the standing arm including an opening extending partially between the first and second ends; an elongated support arm having first and second spaced apart ends pivotably coupled therebetween to the stand arm by a pivot assembly within the opening, the support arm rotatable about the pivot assembly between a horizontal and a vertical position, the support arm moveable in a vertical direction along a portion of the stand arm when at least in the horizontal position with the pivot assembly vertically moveable within the opening, the support arm having a first slot extending between the first end of the support arm and the pivot assembly and a second slot extending between the second end of the support arm and the pivot assembly; an adjustable first mounting assembly slidably attached to the support arm within the first slot and including a rotatable ball adapted for attachment to a first flat screen display; and an adjustable second mounting assembly slidably attached to support arm within the second slot and including a rotatable ball adapted for attachment to a second flat screen display, whereby the first and second flat screen displays can be moved along the support arm and rotatable about their respective mounting assembly.

In accordance with another embodiment of the present invention there is disclosed an apparatus adapted for positioning an electronic device in a plurality of orientations, the apparatus comprising a first member having first and second spaced apart ends, the first end of the first member coupled to a support; an elongated second member having first and second spaced apart ends pivotably coupled therebetween to the first member at a pivot point, the second member rotatable about the pivot point between a vertical and a horizontal orientation; and a first coupling assembly attached to the second member adapted for securing an electronic device thereto, the first coupling assembly moveable along the second member between the first and second ends of the second member.

In accordance with another embodiment of the present invention there is disclosed an apparatus for positioning a plurality of electronic devices in a plurality of orientations, the apparatus comprising an extension arm assembly having first and second spaced apart ends, the first end of the extension arm assembly adapted to be coupled to a supporting surface whereby the second end is arrangable in a plurality of vertical and horizontal orientations; an elongated member having first and second spaced apart ends pivotably coupled therebetween to the second end of the extension arm assembly at a pivot point, the member rotatable about the pivot point between a vertical and a horizontal orientation, the member moveable in vertical and horizontal directions upon corresponding movement of the second end of the extension arm assembly; first and second coupling assemblies attached to the member each adapted for securing an electronic device thereto, each of the first and second coupling assemblies moveable along a portion of the member between the pivot point and an adjacent first and second end of the member.

In accordance with another embodiment of the present invention there is disclosed an apparatus for a plurality of electronic devices, the apparatus adapted for positioning the electronic devices in a plurality of orientations, the apparatus comprising an elongated stand arm having first and second spaced apart ends, the first end adapted to be coupled to a supporting surface, the stand arm including an opening extending partially between the first and second ends; an elongated support arm having first and second spaced apart ends pivotably coupled therebetween to the stand arm by a pivot assembly moveable within the opening, the support arm rotatable about the pivot assembly between a horizontal and a vertical position, the support arm moveable in a vertical direction along a portion of the stand arm upon vertical movement of the pivot assembly within the opening, the support arm having a first slot extending between the first end of the support arm and the pivot assembly and a second slot extending between the second end of the support arm and the pivot assembly; an adjustable first mounting assembly slidably attached to the support arm within the first slot and adapted for attachment to a first electronic device; and an adjustable second mounting assembly slidably attached to the support arm within the second slot and adapted for attachment to a second electronic device, whereby the first and second electronic devices can be moved along the support arm and rotated about their respective mounting assembly.

BRIEF DESCRIPTION OF THE DRAWINGS

The accompanying drawings, which are incorporated in and form a part of the specification, illustrate the embodiments of the present invention and, together with the description, serve to explain the principles of the invention.

FIG. 4 is a perspective view of an assembled switch arm stand;

FIG. 5 is a perspective view, in partial phantom, of the assembled switch arm stand;

FIG. 33 is a bottom perspective view of the base of the pivot assembly;

FIG. 34 is a top perspective view of an intermediate plate for the pivot assembly;

DETAILED DESCRIPTION

In describing the preferred embodiments of the subject matter illustrated and to be described with respect to the drawings, specific terminology will be resorted to for the sake of clarity. However, the invention is not intended to be limited to the specific terms so selected, and is to be understood that each specific term includes all technical equivalence which operate in a similar manner to accomplish a similar purpose.

Figure 1:
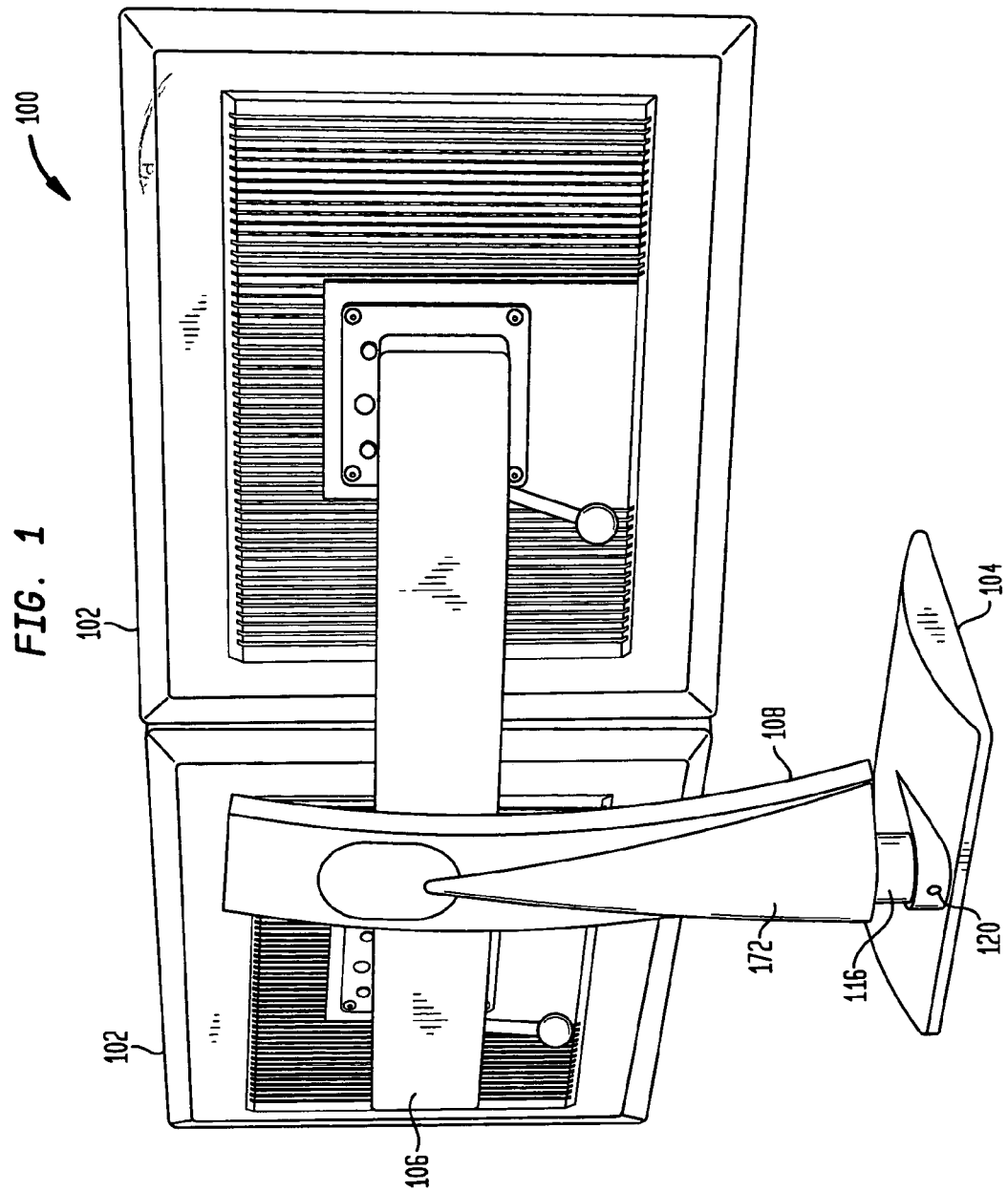
FIG. 1 is a perspective view of a multiple electronic device reorienting support constructed in accordance with one embodiment of the present invention, showing a pair of flat screen displays mounted thereto.
Figure 2:
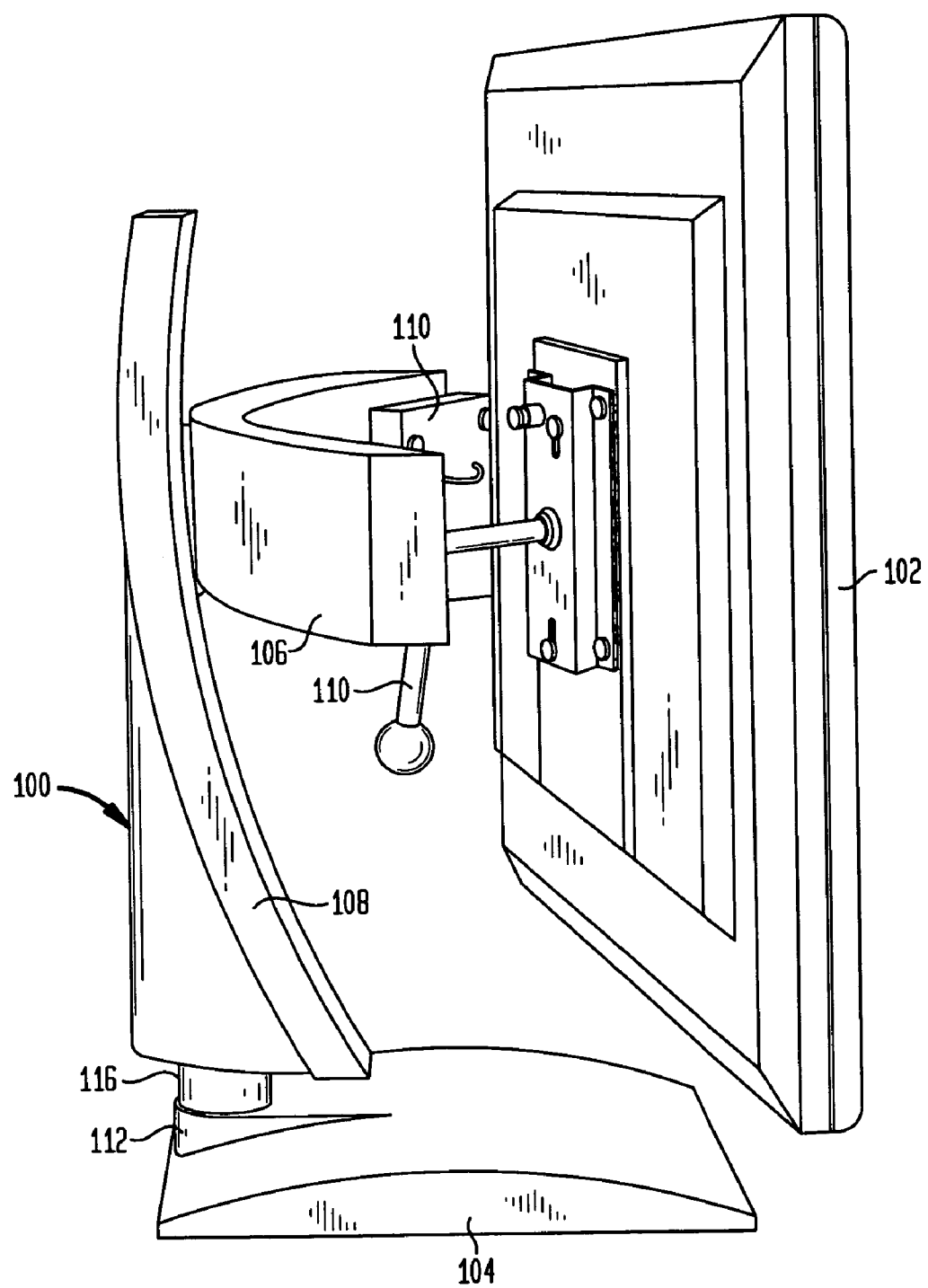
FIG. 2 is a side elevational view of the multiple electronic device reorienting support shown in FIG. 1.

Referring now to the drawings, wherein like reference numerals represent like elements, there is disclosed in FIGS. 1 and 2 a multiple electronic device reorienting support generally designated by reference numeral 100. The support 100 is illustrated for use with a pair of flat screen displays 102 by way of illustrative example. It is to be understood that other electronic devices, such as notebook computers, CRT devices, PDAs, can be used, if desired, with the support 100. Thus, the description of the application of the support 100 in association with flat screen displays 102 is by way of one example only. The support 100 includes a base 104, a switch arm 106, a switch arm stand 108 and a pair of ball joint assemblies 110. Briefly, the base 104 is adapted to support the switch arm stand 108, which in turn, pivotably supports the switch arm 106. The flat screen displays 102 are coupled to the switch arm 106 by means of the ball joint assemblies 110. The ball joint assemblies 110 are moveable along the switch arm 106 and adapted to allow manipulation of the flat screen displays 102 in a plurality of orientations as to be described hereinafter.

Figure 3:
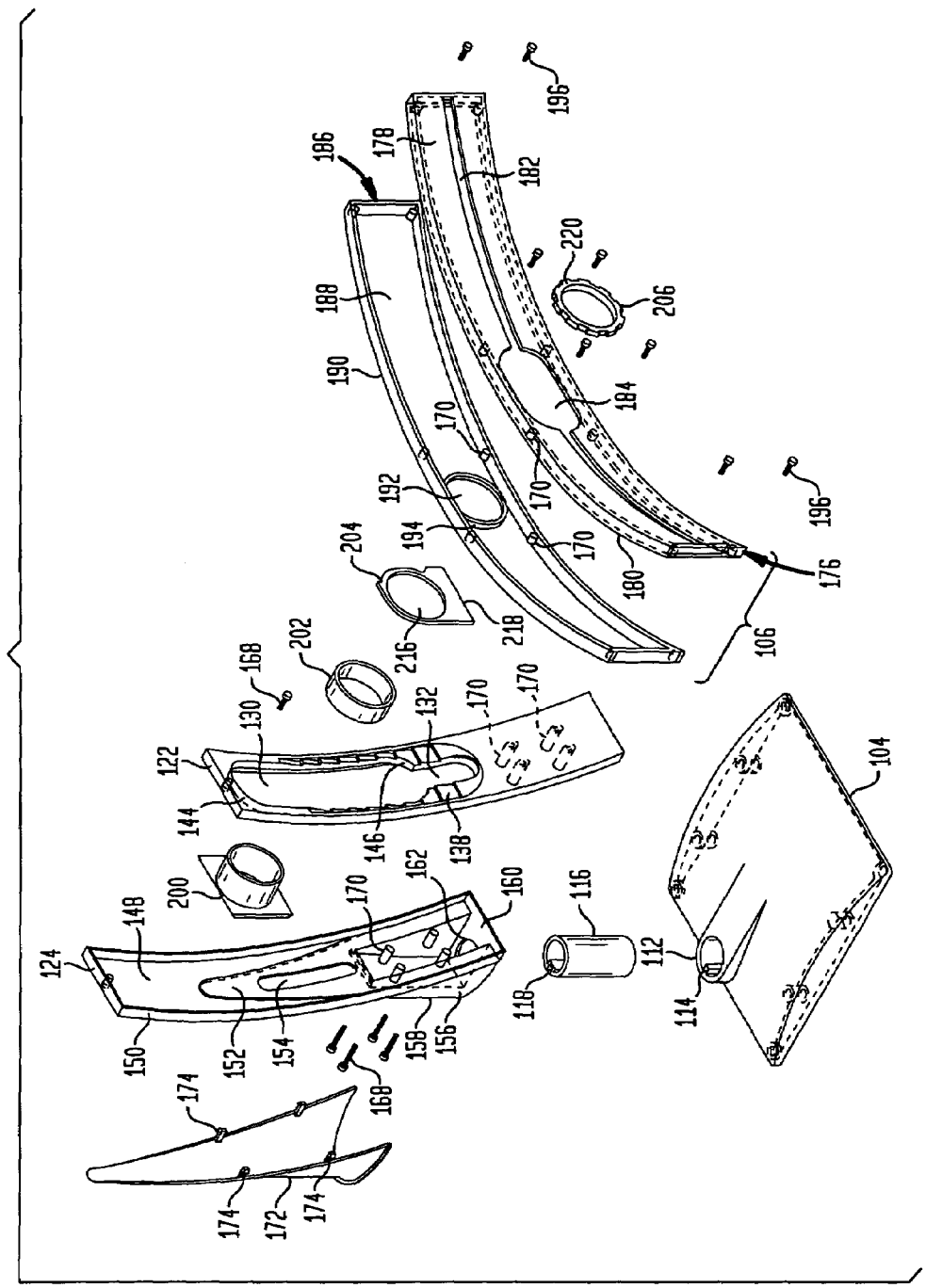
FIG. 3 is an exploded unassembled view of the multiple electronic device reorienting support.

Referring to FIG. 3, the base 104 forms the support structure for the switch arm stand 108. The base 104 may be formed in a variety of shapes, such as rectangular as shown. At one end of the base 104 there is provided a cylindrical sleeve 112 having a projection 114 extending inwardly within the opening of the sleeve. An elongated cylinder 116 is dimensioned for sliding fit within the sleeve 112. The outer wall of the cylinder 116 is provided with a longitudinally extending recess 118 which is adapted to receive the projection 114 within the sleeve 112. By capturing the projection 114 within the recess 118, the cylinder 116 is precluded from rotation. The cylinder 116 may be locked within the sleeve 112 by means of screw 120 which is threaded through the sleeve for engagement with the cylinder, see FIG. 1.

The switch arm stand 108 will be described with reference to FIGS. 3-5. The switch arm stand 108 includes a front member 122 and a back member 124 which are matable together. The front member 122 includes a front wall 126 lying within a curved plane and a surrounding side wall 128. The upper portion of the front member 126 is provided with an elongated opening 130 which communicates at its lower end with a smaller elongated opening 132. Opening 130 is surrounded by a narrow portion 134 of the front wall 126, while opening 132 is surrounded by a wide portion 136 of the front wall 126. The narrow and wide portions 134, 136 of the front wall 126 are formed with a row a contiguous steps 138 each having a ledge 140. The steps 138 cascade downwardly along the sides of the openings 130, 132, the steps adjacent opening 130 being narrow than the steps adjacent the opening 132. The opening 130 is delineated by a side wall which forms an oval shaped track 142 having an upper limit 144 and a lower limit 146.

The back member 124 includes a back wall 148 having a curved shaped conforming to the radius of curvature of the front wall 126, and a surrounding side wall 150. The back wall 148 includes a recessed triangular region 152 which contains a narrow elongated opening 154.

Figure 6:
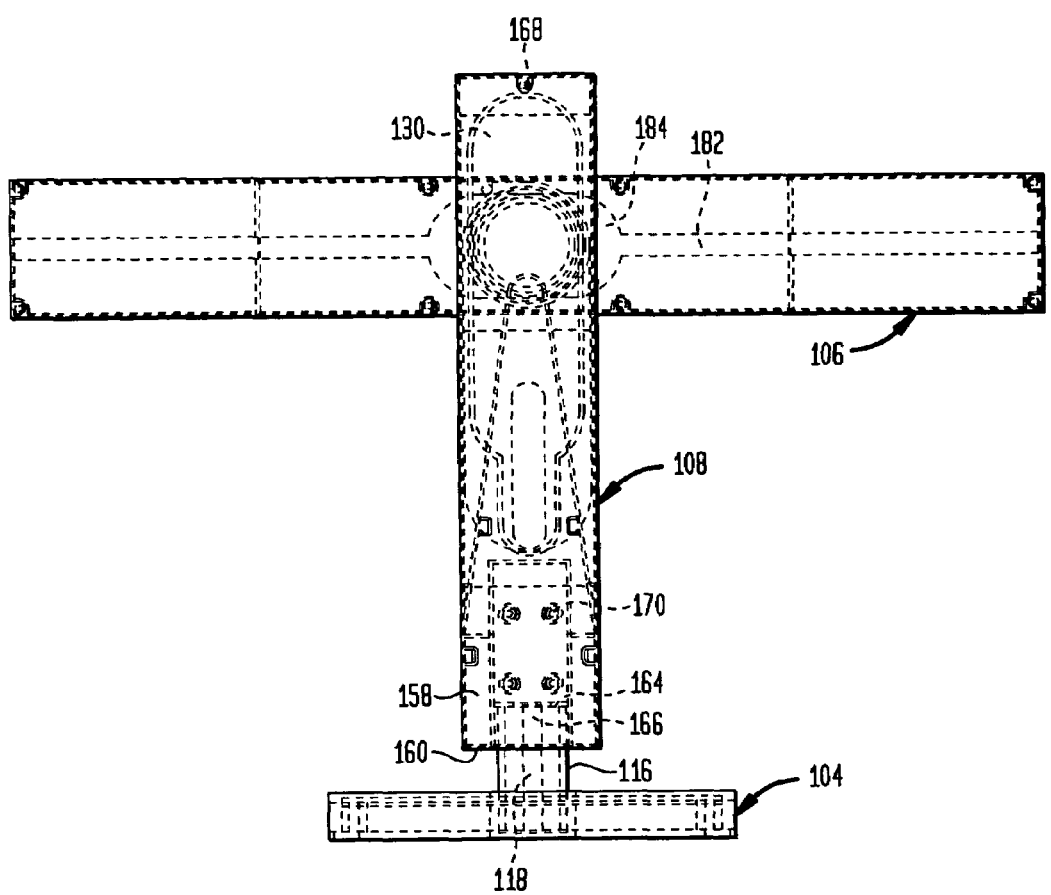
FIG. 6 is a front elevational view of the multiple electronic device reorienting support.
Figure 7:
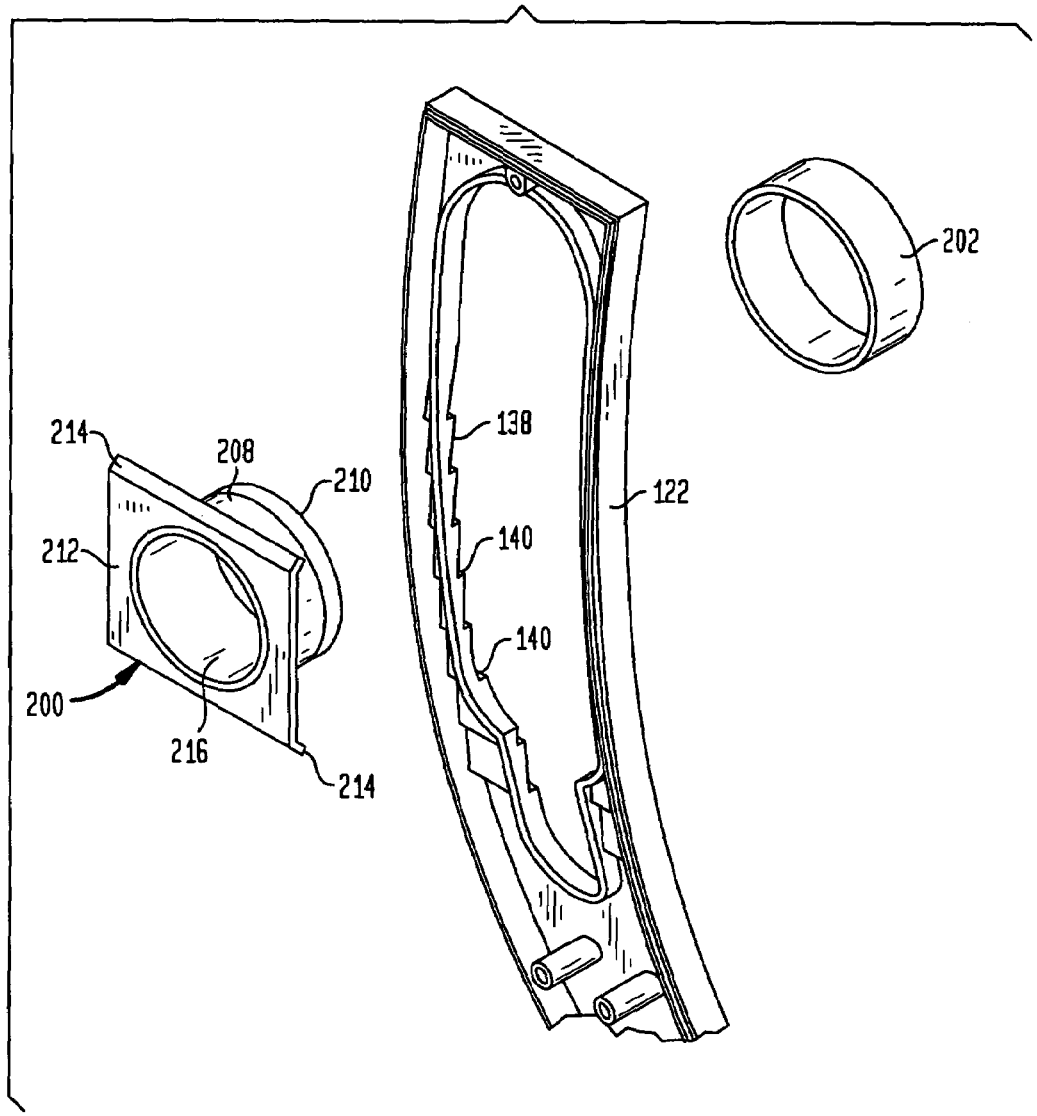
FIG. 7 is an exploded unassembled view of the pivot assembly constructed in accordance with one embodiment of the present invention.

A triangular housing 156 is formed at the lower end of the back wall 148. As best shown in FIGS. 3 and 6, the triangular housing 156 is formed by a rear wall 158 and a bottom wall 160 having a circular opening 162 therein. Opening 162 is sized so as to slidingly receive cylinder 116. The rear wall 158 inwardly supports a projecting plate 164 to which there is attached a projection 166.

The front and back members 122, 124 are mated together and secured by any suitable means such as welding, adhesive bonding, screws and the like. As shown in FIGS. 3 and 5, a plurality of screws 168 are used to join the front and back members 122, 124 together. For this purpose, the inwardly facing portions of the front and back members 122, 124 are provided with cylindrical projections 170 adapted for receiving the screws 168.

With the switch arm stand 108 in assembled relationship, the switch arm stand is mounted to the base 104 via the cylinder 116. In this regard, the cylinder 116 is received within opening 162 within the bottom wall 160 of the triangular housing 156. The switch arm stand 108 rests on the cylinder 116 by engagement of the plate 164 with the top of the cylinder 116. The projection 166 which extends from the plate 164 is received within the recess 118 within the outer wall of the cylinder 116. As a result, the switch arm stand 108 is precluded from rotating about the cylinder 116 by interference of the projection 166 within the recess 118. The switch arm stand 108 may be secured to the cylinder 116 using a suitable screw in the manner as described with respect to screw 120. The screws 168 which attach the front and back members 122, 124 together, may be concealed using a triangular cover 172 which is received within the triangular region 152 within the back wall 148 and secured thereto via a plurality of interfering friction clips 174 or the like. The cover 172 also conceals cables which are connected to the flat screen displays 102 as to be described hereinafter.

As best shown in FIG. 3, the switch arm 106 is constructed from an elongated front member 176 having a front wall 178 and a surrounding side wall 180. The front wall 178 includes a longitudinally extending slot 182 arrangement midway between opposing longitudinal side walls. The slot 182 communicates centrally within the front wall 178 with an enlarged oval shaped opening 184. The front member 176 is provided with a radius of curvature which may be the same or different from the radius of curvature defined by the switch arm stand 108. In the preferred embodiment, the radius of curvature will be about the same.

The switch arm 106 includes a back member 186 having a back wall 188 defined by a similar radius of curvature and surrounded by a side wall 190. A circular opening 192 is formed midway within the back wall 186 which defines a surrounding lip 194. The front and back members 176, 186 are joined together by any suitable means, for example, using screws 196, adhesive bonding, welding and the like. When the switch arm 106 is arranged is assembled form, opening 184 in the front member 176 is arranged to overlying the opening 192 in the back member 186.

Figure 10:
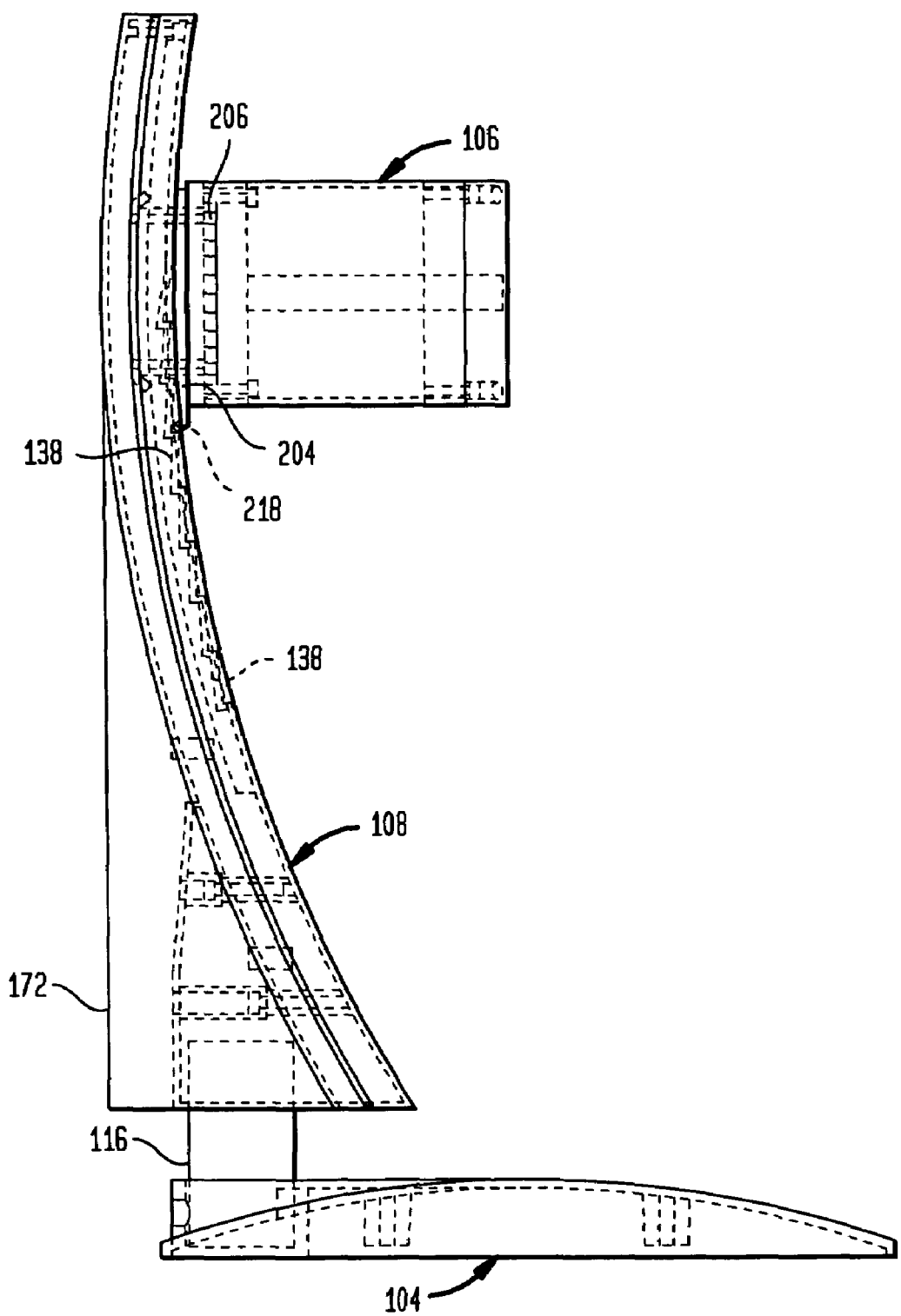
FIG. 10 is a side elevational, in partial cross section, of the multiple electronic device reorienting support.
Figure 11:
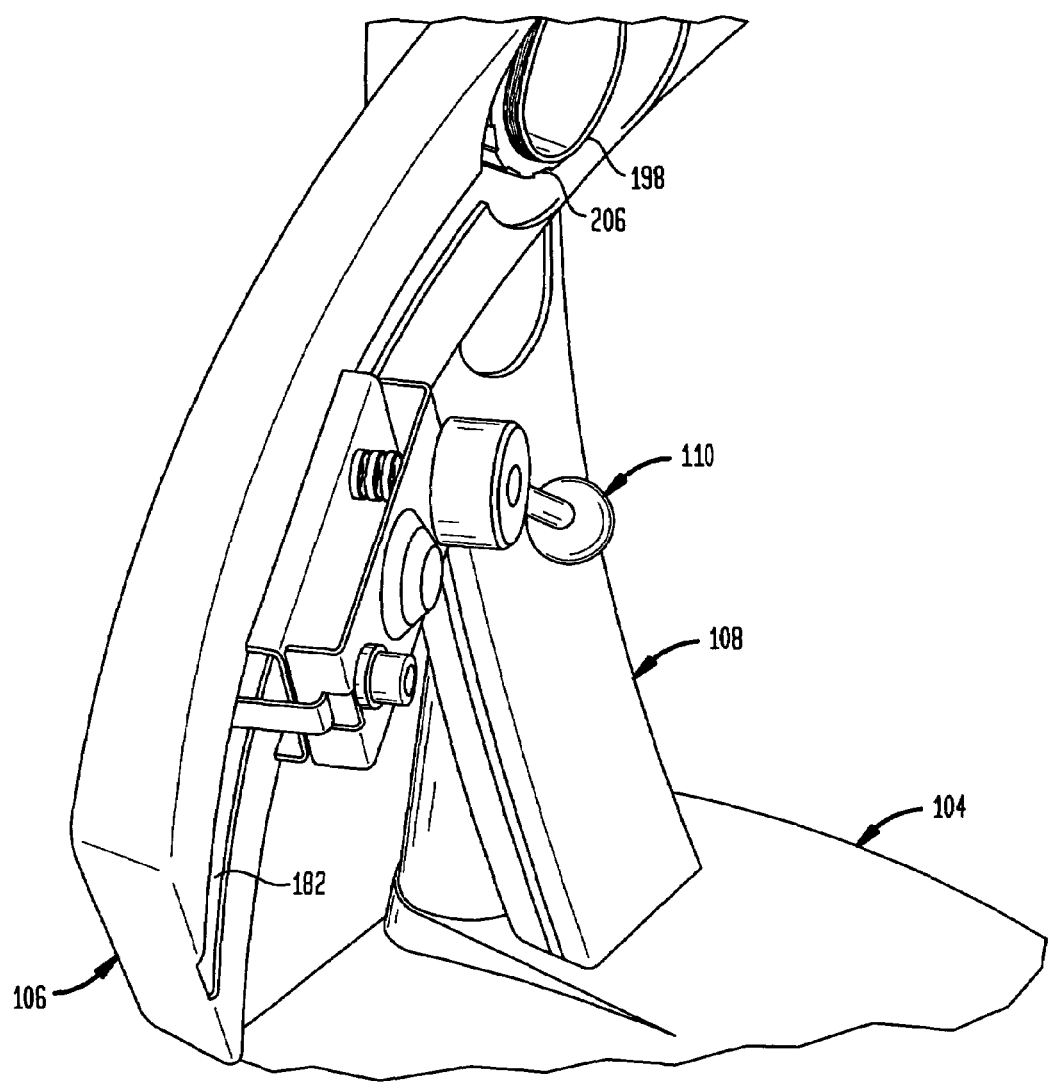
FIG. 11 is a perspective view of a ball joint assembly coupled to a support arm and constructed in accordance with one embodiment of the present invention.

The switch arm 106 is pivotably coupled to the switch arm stand 108 by means of a pivot assembly 198 as broadly shown in FIG. 11. The pivot assembly 198, as best shown in FIGS. 3 and 7-10, includes a tube assembly 200, a bearing 202, a locking plate 204 and a locking nut 106. The tube assembly 200 includes a cylindrical tube 208 having a threaded end 210. The other end of the tube 208 is attached to a rectangular plate 212 such as by welding and the like. The rectangular plate 212 is bound on opposing parallel top and bottom sides by a pair of inwardly bent lips 214. In the preferred embodiment, the lips 214 are directed inwardly towards tube 208 at an angle of about 45°. The plate 212 may be provided with an opening 216 which communicates the interior of the tube 208 with opening 154 in the back member 124. The openings 154, 216 will allow for the passage of electrical cables from the flat screen displays 102 which are fed through the cover 172 if so desired.

The bearing 202 is in the nature of a cylindrical member constructed typically of polymer material and sized to slide over the tube 208 within the tube assembly 200. The locking plate 204 includes a central opening 216 sized to receive the bearing 202. The lower edge of the locking plate 204 is provided with an elongated inwardly directed lip 218. The lip 218 is displaced, in accordance with the preferred embodiment, at an angle of about 45°. The locking nut 206 is in the nature of a ring having a plurality of internal threads 220. In accordance with the preferred embodiment, the tube assembly 200, locking plate 204 and lock nut 206 are constructed from metal materials, while the bearing 202 is constructed from synthetic materials.

Figure 8:
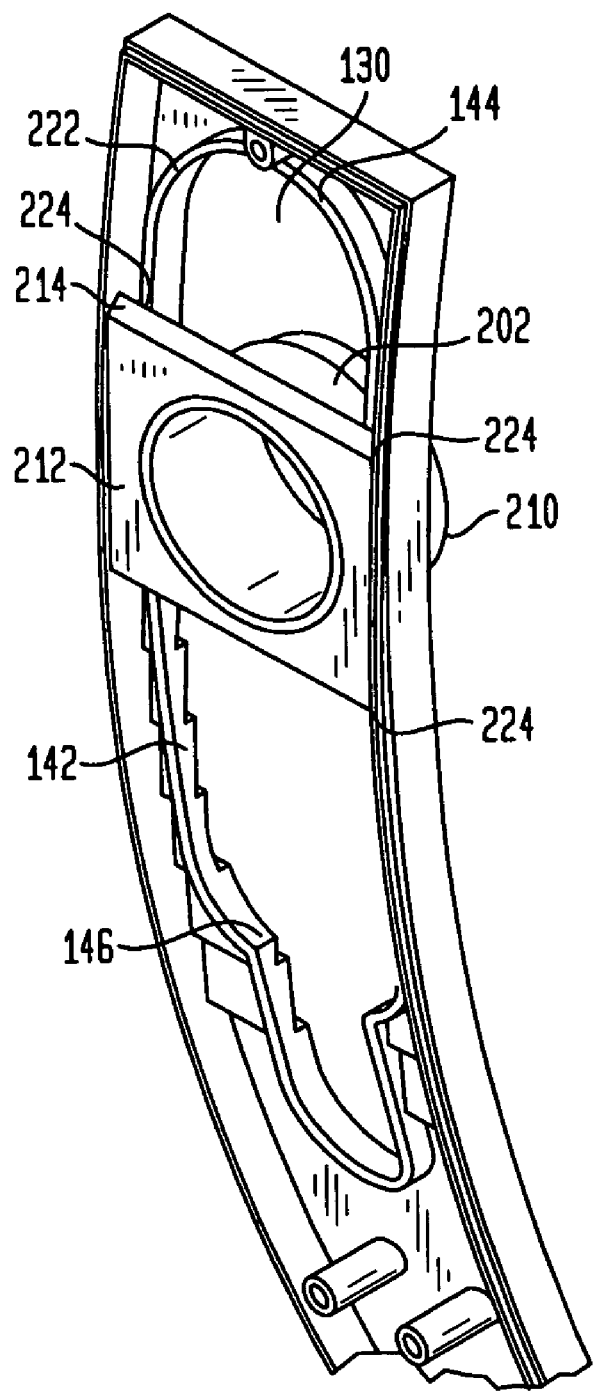
FIG. 8 is an assembled perspective view of the pivot assembly in association with the switch arm stand.
Figure 9:
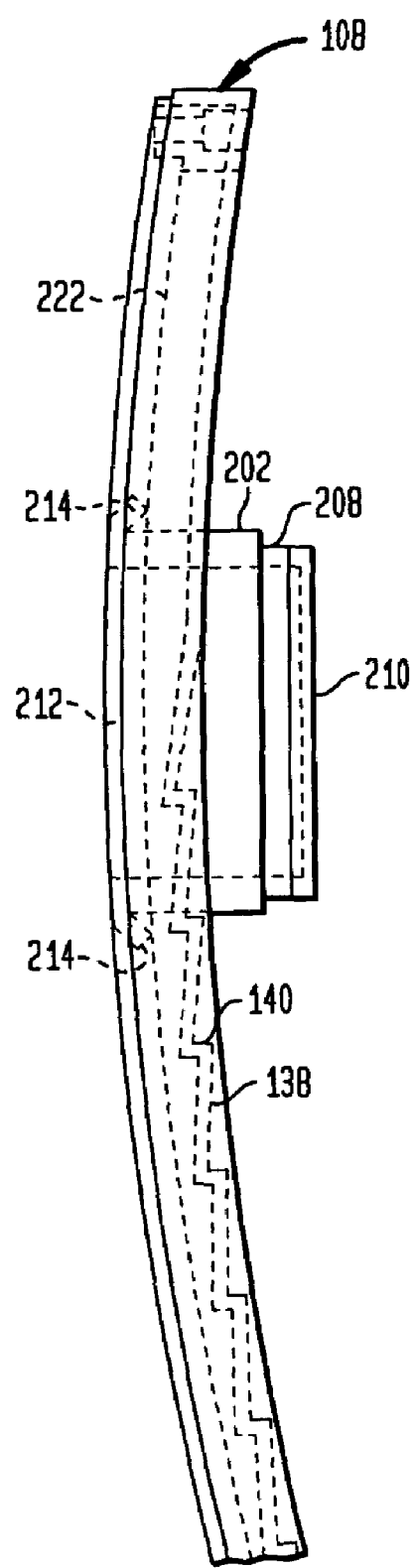
FIG. 9 is a side elevational view of the assembled pivotal assembly.

The pivot assembly 198 is assembled to pivotably couple the switch arm 106 to the switch arm stand 108. Prior to mating the front and back members 122, 124 of the switch arm stand 108, the tube assembly 200 is positioned as shown in FIG. 8. Specifically, the plate 212 is arranged overlying the rear of opening 130 such that tube 208 extends outwardly and away from the front wall 126. The plate 212 is supported by the lips 214 being arranged in sliding engagement with edge 222 which is formed by the track 142 surrounding opening 130 thereby defining points of contact identified as locations 224. The bearing 202 is slid over the tube 208 so as to slide within the confines of the wall forming the track 142. The upper and lower limits of the track 144, 146 are defined by circular portions, whose radius of curvature corresponds generally to the radius of curvature of the bearing 202. The upper and lower limits 144, 146 act as stops when engaging the bearing 202 to prevent further movement of the tube assembly 200.

As shown in FIG. 10, the locking plate 204 is positioned over the threaded end 210 of tube 208 with lip 218 arranged horizontally for engagement with the ledge 140 of a pair of aligned steps 138. With the lip 218 engaged by the ledge 140, the tube assembly 200 is precluded from sliding downwardly within the opening 130 within the switch arm stand 108.

The switch arm 106 is pivotably attached to the tube assembly 200 by initially receiving the threaded end 110 of tube 208 through opening 192. The switch arm 106 is held in position by engaging the locking nut 206 about the threaded end 210 of tube 208. By tightening the locking nut 206, the switch arm 106 is compressed rearwardly against the locking plate 204 and the switch arm stand 108 to maintain the desired orientation of the switch arm.

Figure 16:
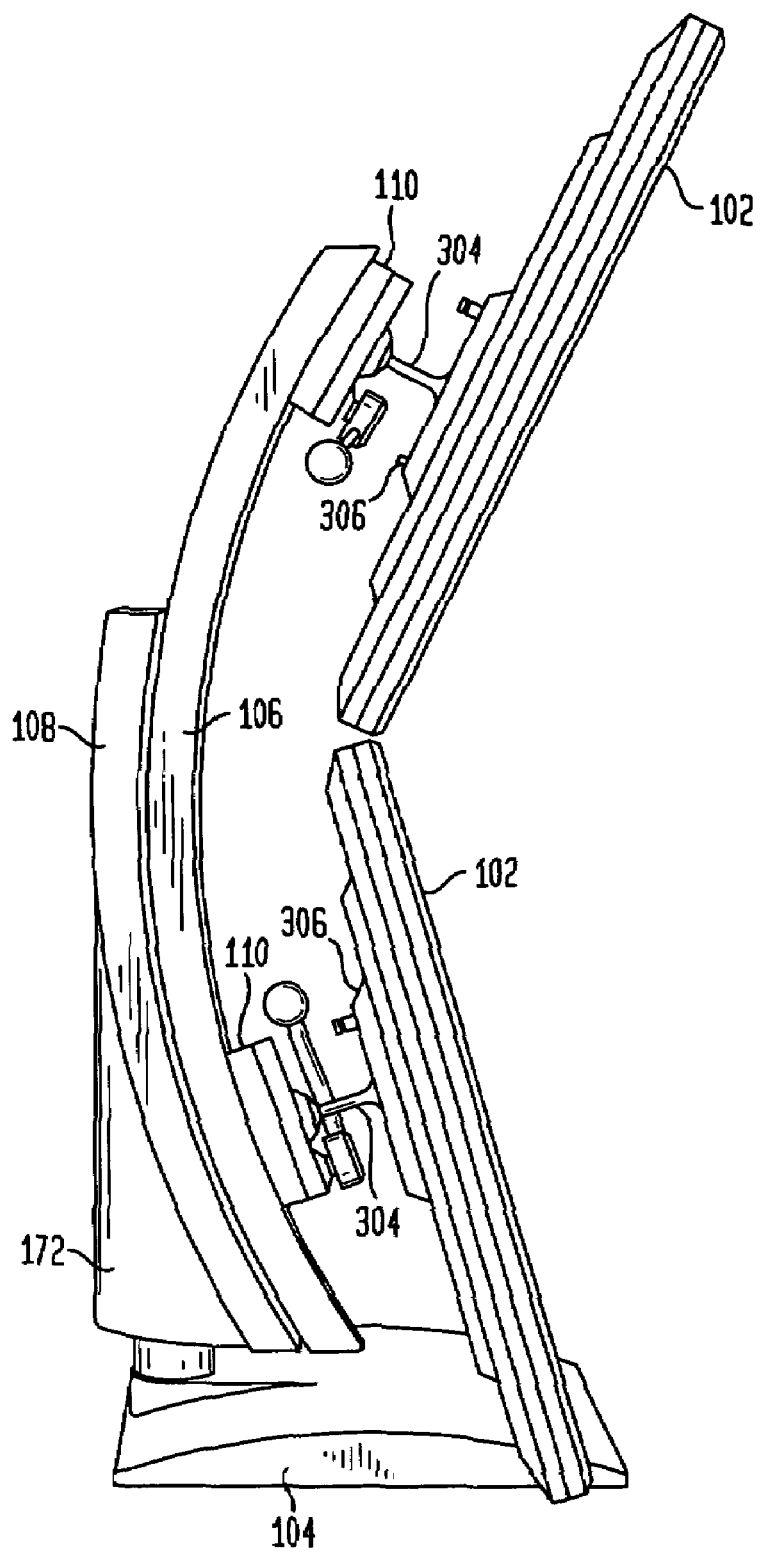
FIG. 16 is a perspective view of the multiple electronic device reorienting support showing the positioning of a pair of flat screen displays in a vertical orientation.
Figure 17:
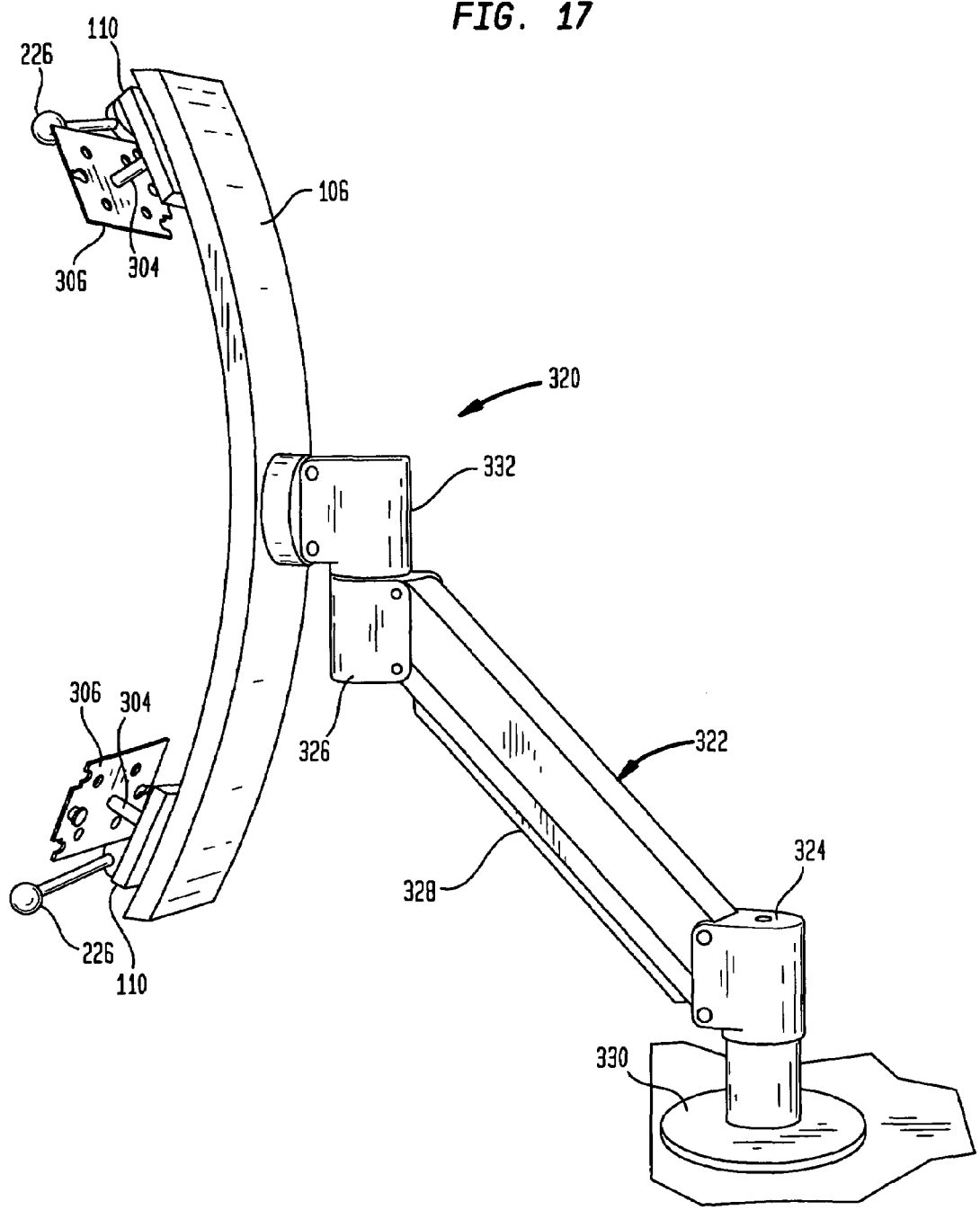
FIG. 17 is a perspective view of a multiple electronic device reorienting support constructed in accordance with another embodiment of the present invention showing the position of the switch arm in a vertical orientation.

There will now be described the manipulation of the switch arm 106 using the pivot assembly 198. The switch arm 106 may be rotated about the tube assembly 200 by loosening the locking nut 206 which is accessible through the opening 184, see FIG. 11. The switch arm 106 may now be rotated between various orientations such as between the horizontal orientation shown in FIG. 1 and the vertical orientation in alignment with the switch stand 108 as shown in FIG. 16. In this regard, the pivot assembly 198 is adapted to rotate the switch arm 106 360° about the tube assembly 200. The switch arm 106 may be locked in its reoriented position by tightening the locking nut 206. As previously described, the locking plate 204 is positioned between the switch arm stand 108 and the switch arm 106. Upon tightening of the locking nut 106, the switch arm 106 is sandwiched in compression with the switch arm stand 108 and locking plate 204, thereby maintaining the orientation of the switch arm.

The pivot assembly 198 is adapted to maintain the switch arm 106 tipped slightly upwardly, for example, about 10° to horizontal. This is to compensate for the weight of the flat screen displays 102 when attached to the switch arm 106. In this regard,; the weight of the flat screen displays 102 will cause the switch arm 106 to tilt downwardly to offset the upward tilt, thereby positioning the displays in a horizontal position.

The switch arm 106 may be raised and lowered using the pivot assembly 198. As previously noted, the locking plate 204 is arranged with its lip 218 resting in one of the ledges 140 of the steps 138. This prevents the switch arm 106 from moving downwardly under either its own weight or that of the supported flat screen displays 102. To reposition the switch arm 106, the locking nut 206 is loosened to allow the lip 218 of the locking plate 214 to disengage. By pulling the switch arm 106 slightly forward, sufficient clearance is provided for the displacing the pivot assembly 198 downwardly with lip 218 clearing the steps 138. The switch arm 106 is guided by the bearing 202 being received within the opening 130 which is bound by track 142.

As previously described, the pivot assembly 198 may be moved upwardly until the bearing 202 is engaged by the upper limit 144 of the track 142 and downwardly until the bearing is engaged by the lower limit 146 of the track. Once the switch arm 106 has been positioned in its proper vertical orientation, the switch arm 106 is rotated into its proper orientation. Thereafter, the locking nut 206 is rotated thereby compressing the switch arm 106 against the locking plate 204, which in turn, forces the lip 218 into and against the ledge 140 of the adjacent step 138. With the locking nut 206 tightened, the switch arm 106 is held in proper position along the switch arm stand 108.

Figure 12:
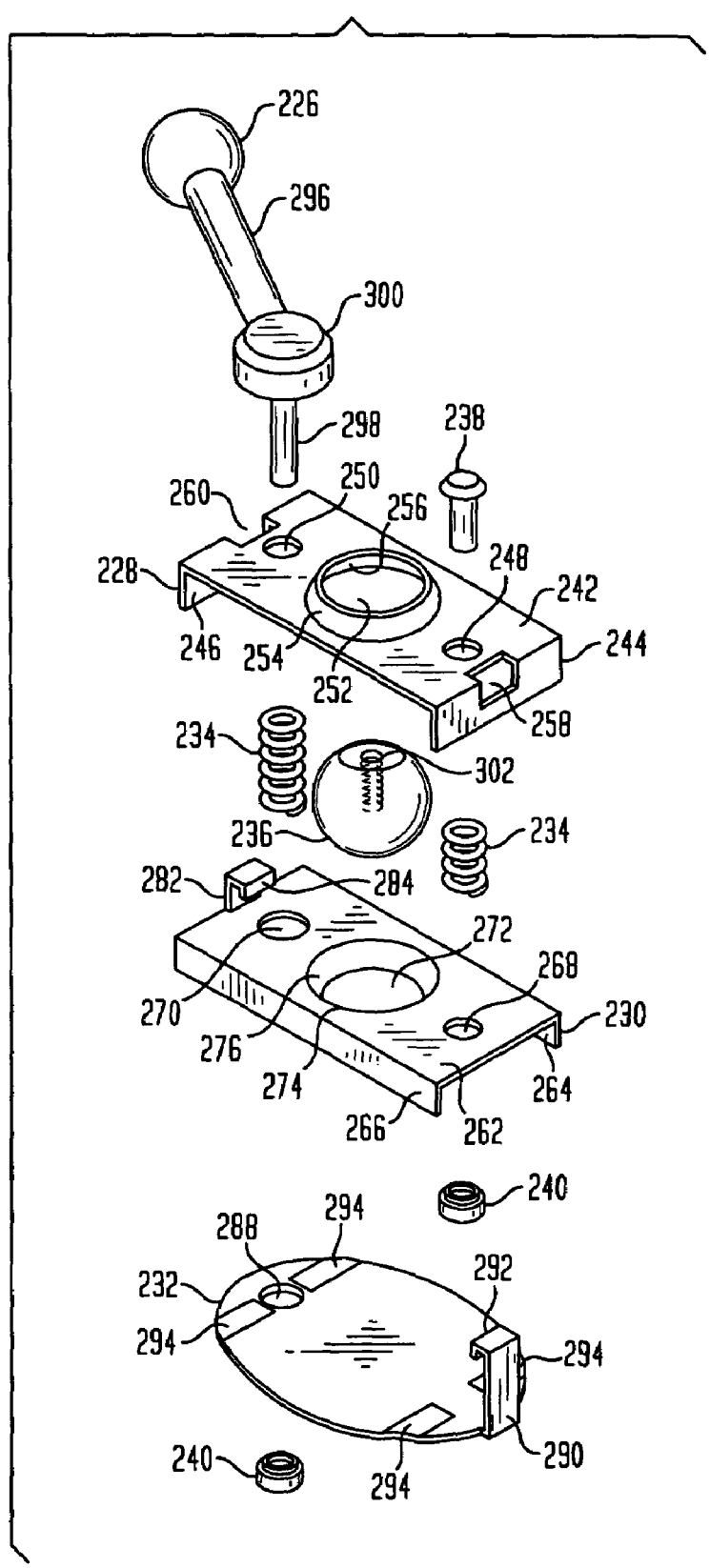
FIG. 12 is an exploded unassembled view of the ball joint assembly.

The flat screen displays 102 are mounted to the switch arm 106 using the ball joint assembly 110 or other suitable assembly therefore. The ball joint assembly 110 is slidably mounted to the switch arm 106 within the slot 182 as shown in FIG. 11. A ball joint assembly 110 in accordance with one embodiment of the present invention will now be described with specific reference to FIGS. 12-14. The ball joint assembly 110 includes a handle 226, a top plate 228, a middle plate 230, an inside plate 232, a pair of compression springs 234, a plastic ball 236, a screw 238 and a pair of pem nuts 240.

The top plate is constructed generally as a U-shaped member having a top wall 242 and a pair of spaced apart end walls 244, 246. The top wall 242 is provided with a pair of spaced apart holes 248, 250 and a central opening 252 defined by an upwardly facing conical segment 254 having an inner wall 256 formed with a predetermined radius of curvature. The top wall 242 and end walls 244, 246 at their location of interconnection is formed with a rectangular opening 258, 260.

The middle plate 230 is generally constructed as a U-shaped member having a top wall 262 and a pair of spaced apart side walls 264, 266. The top wall 262 is provided with a pair of spaced apart holes 268, 270 which are alignable with holes 248, 250 in the top plate 228. The top wall 262 is provided with a central opening 272 defined by a downwardly facing conical segment 274 having an inner wall 276. The inner wall 276 has the same radius of curvature as inner wall 256 of the conical segment 254. In this regard, the opposing conical segments 254, 274 are alignable with each other so as to define a spherical receiving cavity 280 for ball 236. One end of the middle plate 230 is provided with an upstanding member 282 having a downwardly directed hook end 284 overlying the top wall 262 in spaced apart relationship.

The inside plate 232 is shown by way of one example as an oval plate 286 having a hole 288 at one end thereof, and an upstanding member 290 at the other end thereof. The upstanding member 290 is provided with a hook end downwardly directed overlying and spaced from plate 286. The surface of plate 286 is formed with four spaced apart projecting ribs 294. The ribs 294 may be formed, by way of example, by stamping plate 286 so as to deform outwardly a portion thereof. The ribs 294 provide the plate 286 with increased mechanical gripping strength against the swing arm 106 during operation of the ball joint assembly 110.

Figures 13, 14:
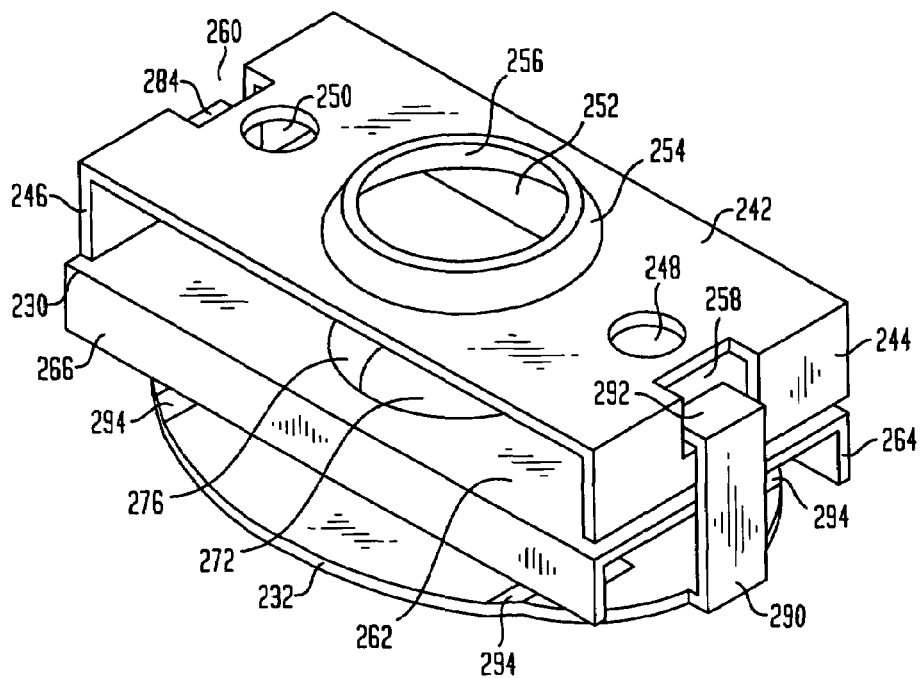
FIG. 13 is a perspective view of a ball joint housing in assembled relationship.
FIG. 14 is a side elevational view, in partial cross-section, showing the ball joint assembly in assembled relationship.

The ball joint assembly 110 is assembled by positioning ball 236 within the spherical cavity 280 provided by opposing the top plate 228 overlying the middle plate 230. In this arrangement, the hook end 284 of upstanding member 282 is received within the rectangular opening 260 in the top plate 228. The inside plate 232 is aligned underlying the middle plate 230 with the hook end 292 of the upstanding member 290 being received within the rectangular opening 258 within the top plate 228 as shown in FIG. 13. Accordingly, upstanding member 290 is longer than the length of upstanding member 282.

As shown in FIG. 14, the arrangement of the top plate 228, middle plate 230 and inside plate 232 arranges the respective holes 250, 270 and 288 in collinear alignment. Similarly, holes 248 and 268 are arranged overlying one another. A pem nut 240 is inserted within hole 288 in the inside plate 232 and another pem nut inserted into the hole 268 in the middle plate 230. A screw 238 surrounded by a compression spring 234 is positioned through hole 248 within the top plate 228 and threadingly engaged at its lower end with the pem nut 240 within the hole 268 in the middle plate 230.

The handle 226 is provided with a lever end 296 which is connected to a threaded shaft 298 at a desired angle via a connector 300. The threaded shaft 298 receives a compression spring 234 and is passed through hole 250 within the top plate 228, through hole 270 within the middle plate 230 and into threading engagement with the pem nut 240 within the inside plate 232.

As shown in FIGS. 11 and 14, the ball joint assembly 110 is slidably mounted to the switch arm 106. In this regard, the front wall 178 of the switch arm 106 is captured between the middle plate 230 and inside plate 232. The screws 238 and their surrounding compression springs 234, as well as the upstanding member 290 on the inside plate 232 are slidingly received within the slot 182. The installation of the ball joint assembly 110 to the switch arm 106 is facilitated by means of the enlarged oval shaped opening 184. In this arrangement, the inside plate 232 is positioned between the front and back members 176, 186 of the switch arm 106, while the middle plate 230 is arranged overlying the front wall 178 of the switch arm.

A flat screen display 102 or other electronic device is coupled to the ball 230 by any suitable means. For example, the ball 230 may be provided with a central threaded bore 302 adapted to receive a threaded stud 304. The threaded stud 304 may be attached to a mounting plate 306 which is attached to the back of the flat screen display 102, see FIG. 16. Accordingly, the orientation of the flat screen display 102 will be dependent upon the orientation of the ball 236 within the ball joint assembly 110.

The ball joint assembly 110 can be slid longitudinally along the length of the switch arm 106. At the same time, the flat screen display 102 can be oriented to an appropriate viewing angle by rotating same via ball 236. The ball joint assembly 110 can be locked in position along the swing arm 110, as well as locking ball 236 by rotating handle 226.

As the handle 226 is rotated, the attached threaded shaft 298 is increased in threading engagement with the pem nut 240 in the inside plate 232. As a result, the front wall 178 of the switch arm 106 is compressed between the middle plate 230 and inside plate 232 thereby fixing the location of the ball joint assembly 110. At the same time, the top plate 228 is compressed towards the middle plate 230 thereby reducing the size of the spherical cavity 280 which supports ball 236. In this regard, the conical segments 254, 274 are forced in compression against the outer surface of the ball 236 to prevent its rotation within the cavity 280, thereby locking the position of the flat screen display 102 by precluding rotation of the ball. It should therefore be appreciated that the ball joint assembly 110 is operative by means of the single operation of the handle 226 to both lock the position of the ball joint assembly with respect to the switch arm 106, but also the orientation of the flat screen display 102 via ball 236.

Figure 15:
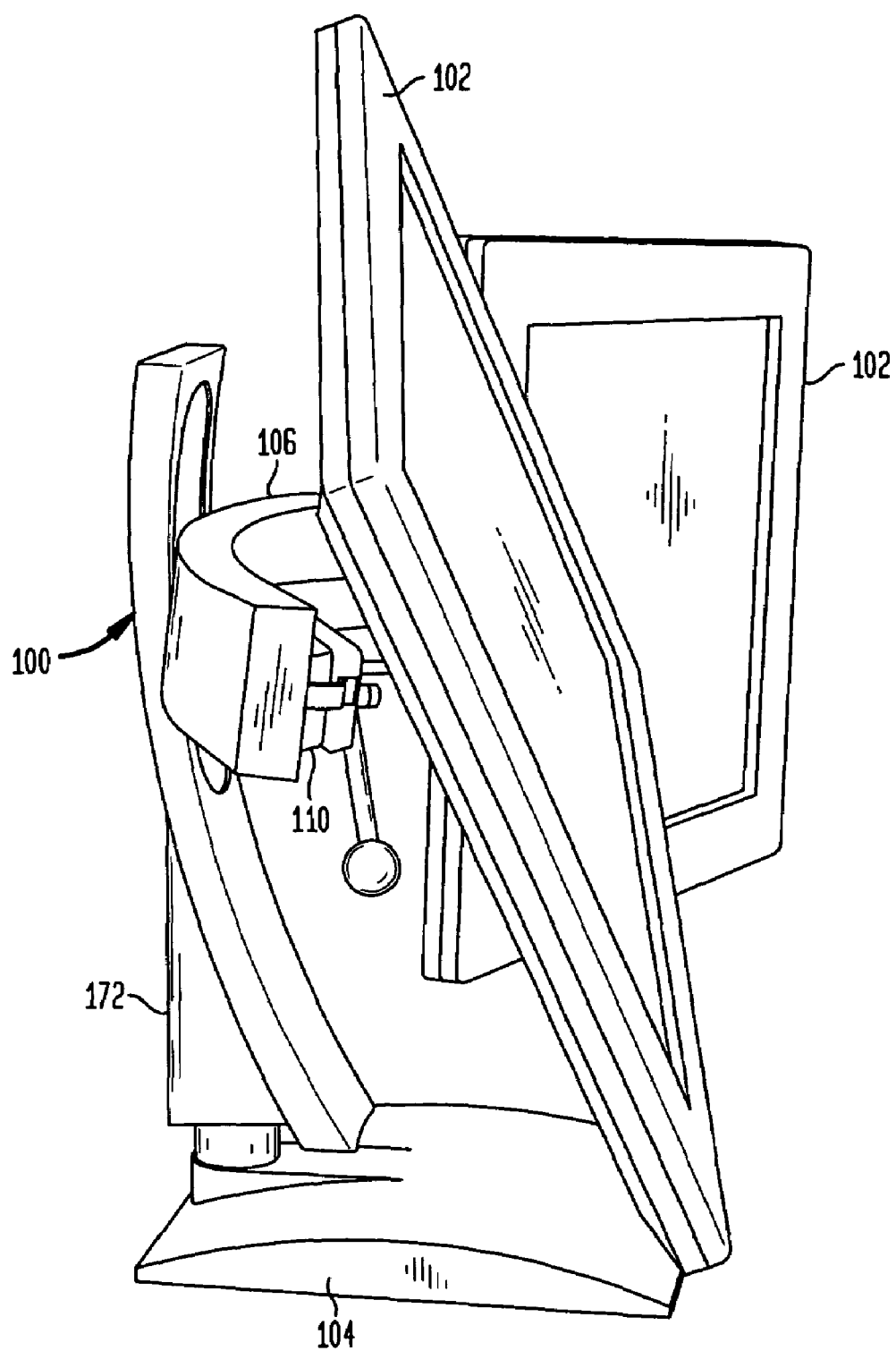
FIG. 15 is a perspective view of the multiple electronic device reorienting support showing the positioning of a pair of flat screen displays in a horizontal orientation.

Referring to FIGS. 15 and 16, there is shown the use of the support 102 in reorienting a pair of flat screen displays 102 into multiple horizontal and vertical orientations. For example, as shown in FIG. 15, the switch arm 106 is arranged in a horizontal orientation maintaining the flat screen displays in side-by-side horizontal relationship. By means of the ball joint assembly 110, one of the flat screen displays 102 is arranged in a vertical orientation, while the other display is arranged at an incline. The flat screen displays 102 can accordingly be arranged in other orientations by means of the ball joint assembly 110. Further, the switch arm 106 may be raised or lowered using the pivot assembly 198, as desired, to position the flat screen displays 102 at the appropriate level desired for viewing.

As shown in FIG. 16, the flat screen displays 102 are arranged in overlying side-by-side vertical relationship. This is accomplished by rotating the swing arm 106 via the pivot assembly 198 to a vertical position arranged in collinear alignment with the switch arm stand 108. This is facilitated by the radius of curvature of the swing arm 106 being generally the same as that of the swing arm stand 108. In a similar manner, the flat screen displays 102 can be reoriented using the ball joint assembly 110 to achieve the best viewing angle as required by the user. In addition, the swing arm 106 may be raised or lowered via the pivot assembly 198.

Referring now to FIGS. 17-20, there will be described a multiple electronic device reorienting support generally designated by reference numeral 320 constructed in accordance with another embodiment of the present invention. Unlike the support 100 having a switch arm 106 coupled to a switch arm stand 108, the switch arm of the support 320 is coupled to an adjustable extension arm assembly 322. The extension arm assembly 322 includes a pair of spaced apart end caps 324, 326 coupled to the ends of a gas spring biased adjustable parallelogram channel assembly 328. The extension arm assembly 322 is configured to form an adjustable parallelogram upon vertical movement of the end cap 326 to enable height adjustment of the switch arm 106 and hence the flat screen displays 102. Examples of extension arm assemblies 322 adapted for use in the support 320 are disclosed in U.S. Pat. Nos. 6,478,274 and 6,409,134, assigned to the same assignee of the present application, both of which are incorporated herein by reference.

End cap 324 is rotationally coupled to a base support 330 which is adapted to be mounted to a stationary object such as a table, workbench, vertical wall portion, and the like. By virtue of such arrangement, the extension arm assembly 322 can rotate about the base support 330 thereby enabling the positioning the displays 102 at the desired angular location. On the other hand, end cap 326 is pivotably coupled to the switch arm 106 by means of an end cap 332.

Figure 21:
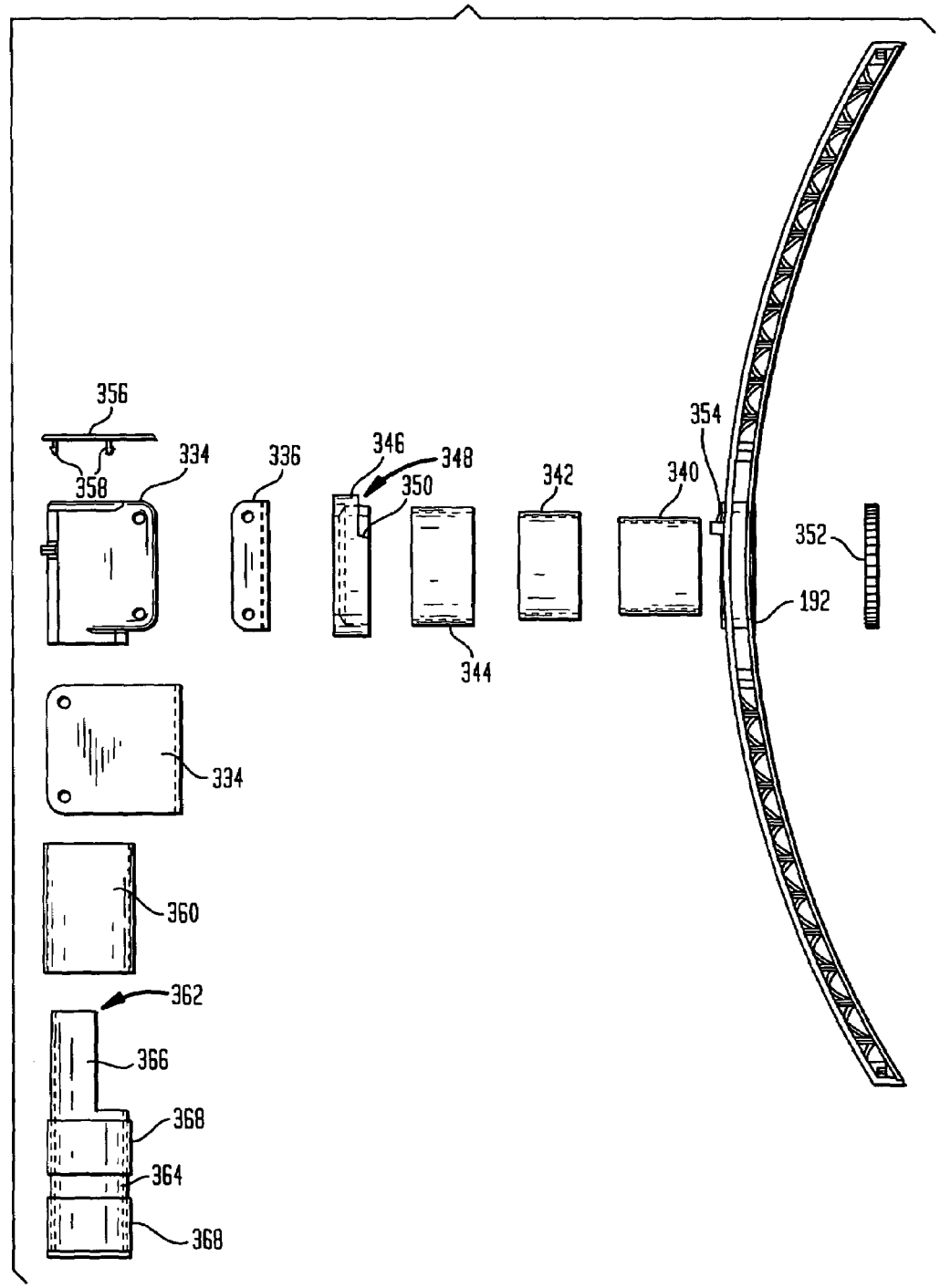
FIG. 21 is a an unassembled front elevational view showing the construction of a pair of end caps for coupling the switch arm to an extension arm assembly.
Figure 22:
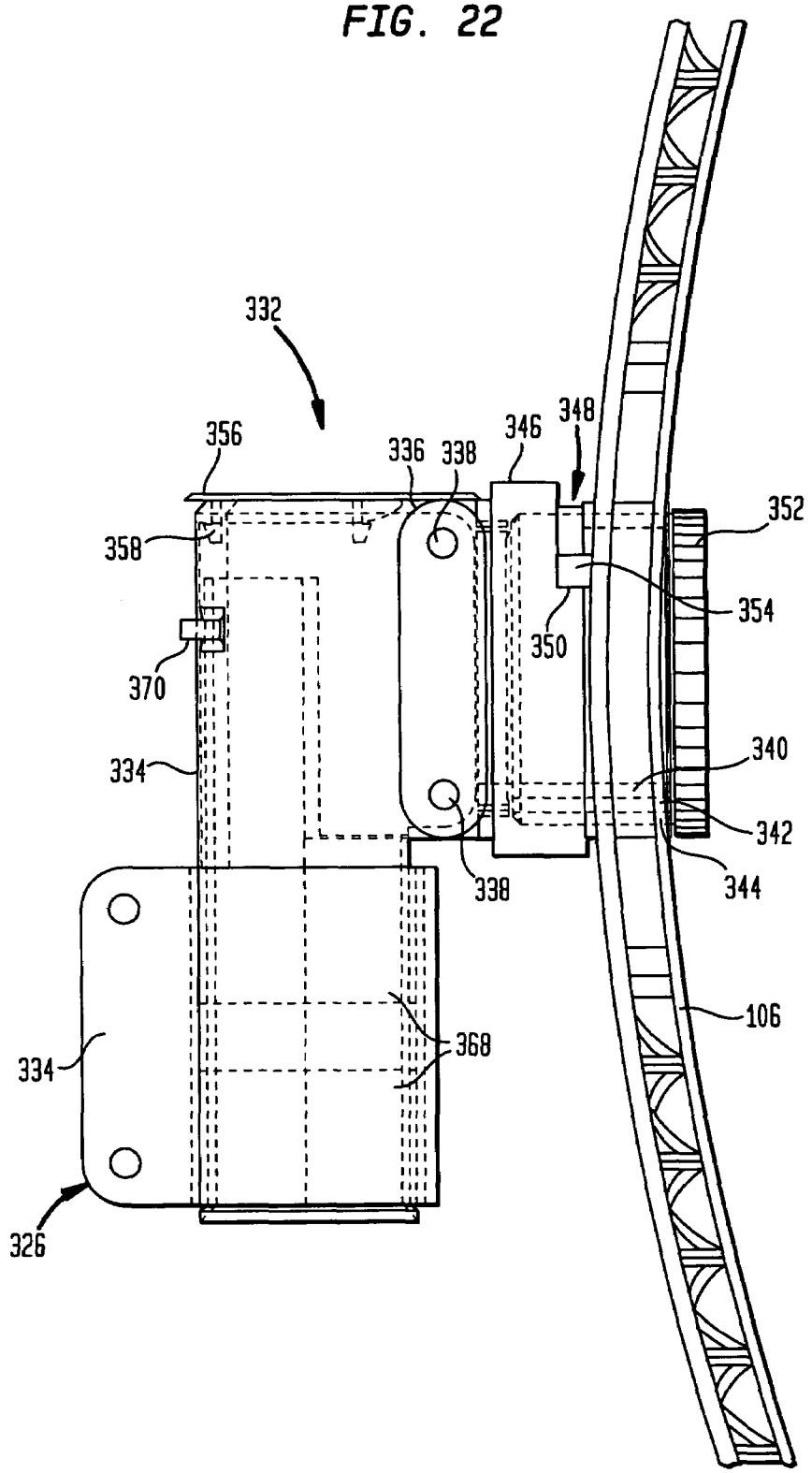
FIG. 22 is an assembled front elevational view of the end caps as shown in FIG. 21.

The end cap 326 is coupled to the switch arm 106, in accordance with one embodiment of the present invention, in the manner as disclosed in FIGS. 21 and 22, as well as FIGS. 3 and 7-9 in general. End cap 332 includes a generally hollow u-shaped housing 334 of the type as disclosed in the '274 or '134 patents. An adaptor bracket 336 is attached within the open side of the housing 334 by means of transverse connecting pins 338. An exterior threaded cylindrical tube 340 is welded to the front of the adaptor bracket 336. A cylindrical polymer bushing 342 is positioned over the threaded cylindrical tube 340. The length of the bushing 342 is shorter than the length of the cylindrical tube 340 so as to expose a threaded portion at the free end thereof. A cylindrical steel tube 344 is press fit into an opening 192 formed in the switch arm 106. A cylindrical ring shaped collar 346 is attached to the adaptor bracket 336 and cylindrical tube 340. The collar 346 is provided on its forward face with a recessed circular track generally designated by reference numeral 348 having an abutment 350 at either end thereof. The track 348 may extend circumferentially about the cylindrical tube 340 in a predetermined amount. In the preferred embodiment, the track 348 will extend greater than 90 degrees between the abutments 350.

In the assembled relationship, the cylindrical tube 340 and bushing 342 are inserted into cylindrical tube 344 whereby the threaded end of the cylindrical tube 340 is accessible within the opening 184 in the switch arm 106. A locking nut 352 is threadingly received about the cylindrical tube 340 thereby providing a compression engagement whereby the switch arm 106 can be locked in various orientations. In this regard, a stop pin 354 projects rearwardly from the switch arm 106 and is captured within the track 348. As the switch arm 106 is rotated, the stop pin will allow its rotation until engagement with one of the abutments 350. The length of the track 340 will therefore determine the permitted angular rotation of the switch arm 106. As previously noted, a 90-degree rotation will allow supported displays 102 to be positioned between horizontal and vertical orientations. It is also contemplated to allow the track 348 to extend over 180 degrees, allowing the switch arm 106 to be rotated either clockwise or counter-clockwise 90 degrees.

The open top of the housing 334 may be closed by means of a cable cap 356 pressed therein and retained by means of, for example, hook-like fingers 358.

End cap 326 includes a similarly constructed housing 334 which receives a steel cylindrical tube 360. Rotationally received within the cylindrical tube 360 is an elongated cylindrical connection tube 362 having a lower portion 364 and an upper portion 366. The lower portion 364 is surrounded by one or more cylindrical polymer bushings 368.

The connection tube 362 extends through cylindrical tube 360 within the housing 334 of the second end cap 326. The bushings 368 provide a polymer-bearing surface which accommodates rotation of the connection tube 362 about its longitudinal axis. In this regard, the upper portion 366 of the connection tube 362 extends into the interior of the housing 334 of the end cap 332. The upper portion 366 of the connection tube 362 may be fixed therein by means of an attachment device 370, such as a screw, bolt, pin and the like. The upper portion 366 may be provided with an opening along its side facing the adaptor bracket 336. As a result, a cable receiving channel is formed through the interior of the connection tube 362 and through the interior of the threaded cylindrical tube 340 so as to allow passage of cables to the supported displays 102. Accordingly, the connection tube 362 can be formed of two c-shaped elongated tubular members of different length.

Figure 19:
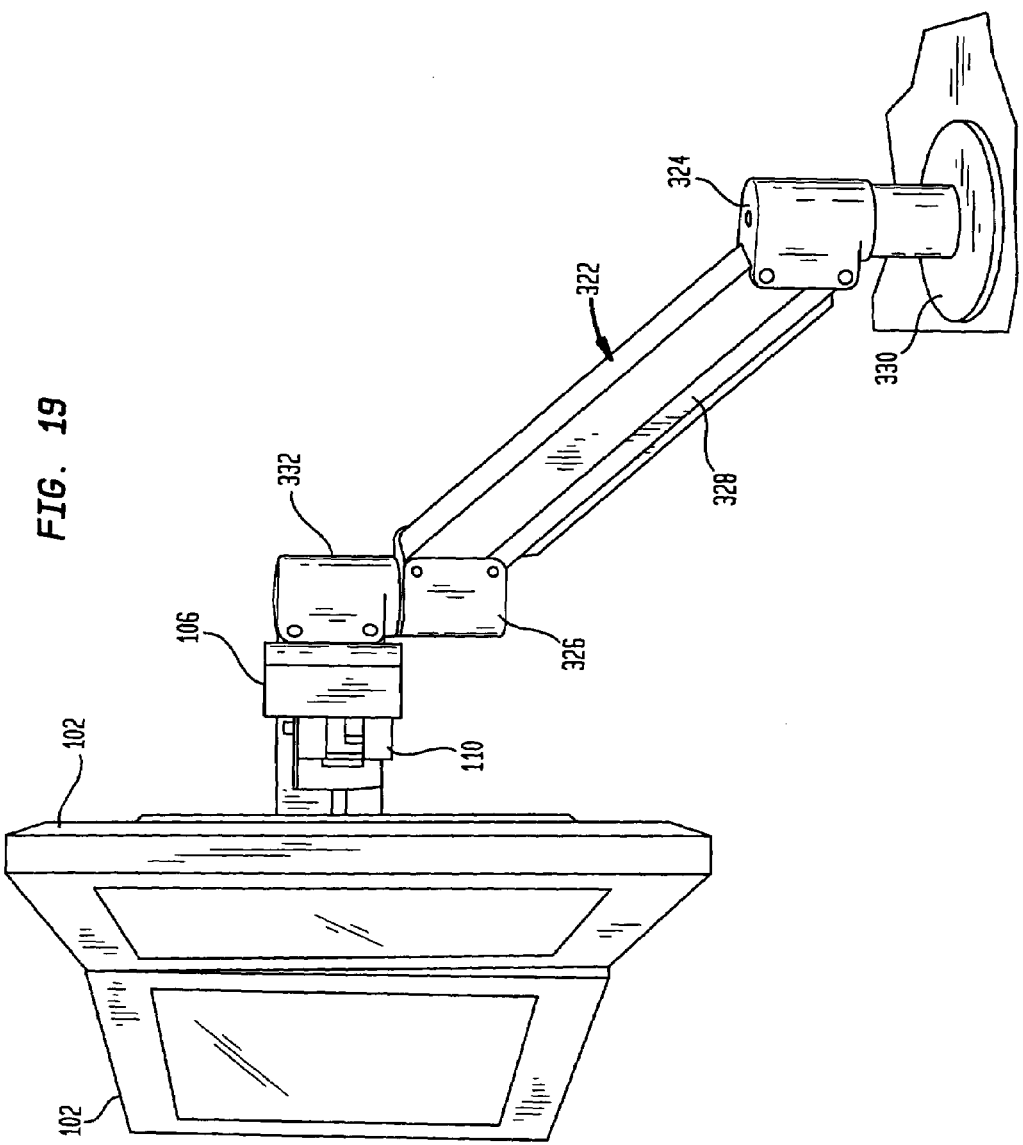
FIG. 19 is a perspective view of the multiple electronic device reorienting support as shown in FIG. 18 supporting a pair of flat screen displays in a horizontal orientation.
Figure 20:
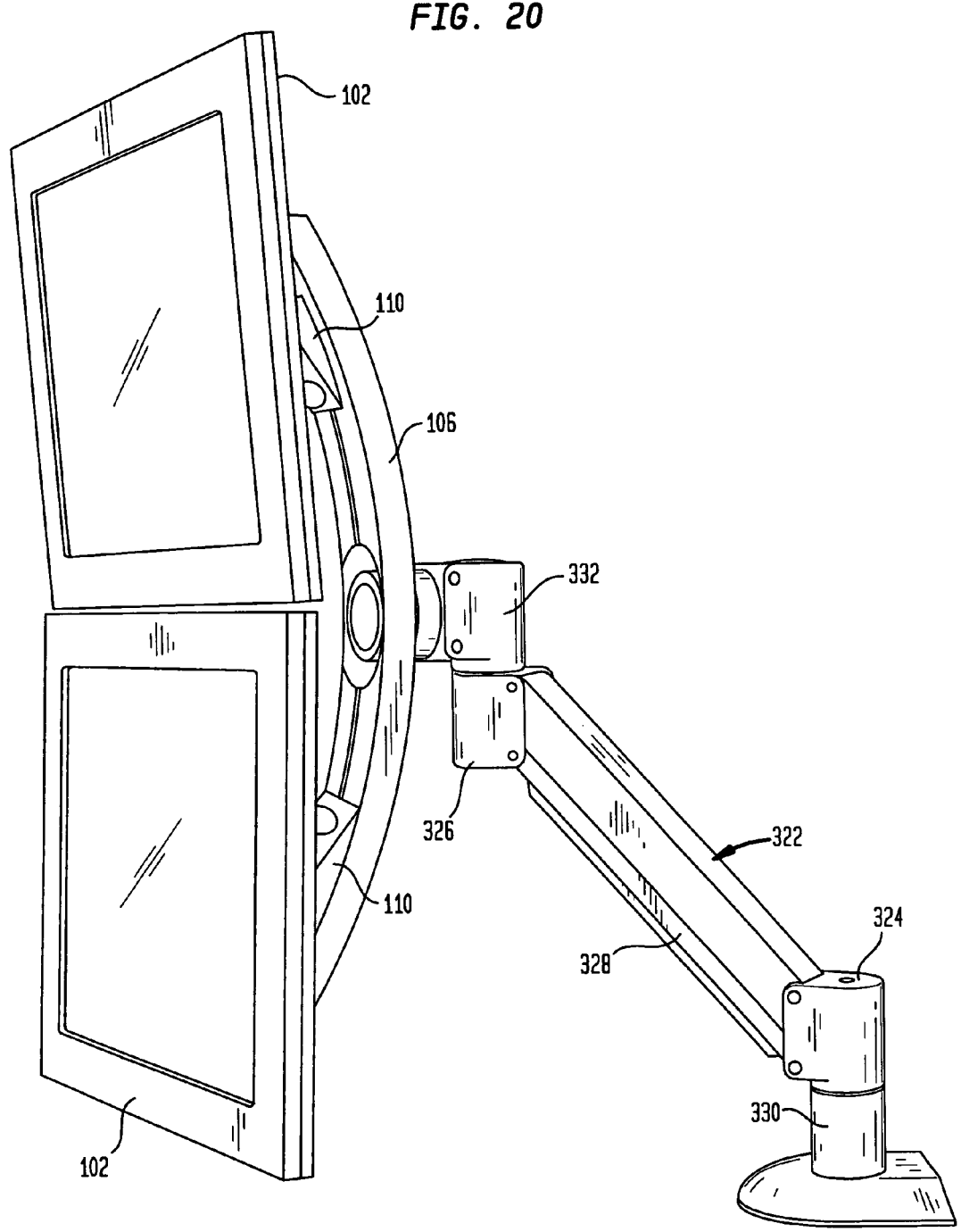
FIG. 20 is a perspective view of the multiple electronic device reorienting support as shown in FIG. 17 supporting a pair of flat screen displays in a vertical orientation.

As shown in FIGS. 19 and 20, the displays 102 may be arranged either horizontally or vertically, upon rotation of the swing arm 106. In addition, each of the displays 102 may be manipulated by the ball joint assembly 110 in the manner as previously described. Where multiple displays 102 are attached to the support 100, it is generally desirable that the displays abut side to side to create the appearance of a single flat display. When the displays 102 are tilted either up or down, it is often required that the displays be adjustably moved away from the switch arm 106, as well as moving the outer displays outwardly from the middle display in order to maintain their contiguous arrangement to provide a single display appearance. The ball joint assembly 110 as previously described generally will not accommodate certain manipulations of the displays 102 as may be desired. Accordingly, there is shown in FIGS. 23-25 the construction of another embodiment of the present invention.

Figure 23:
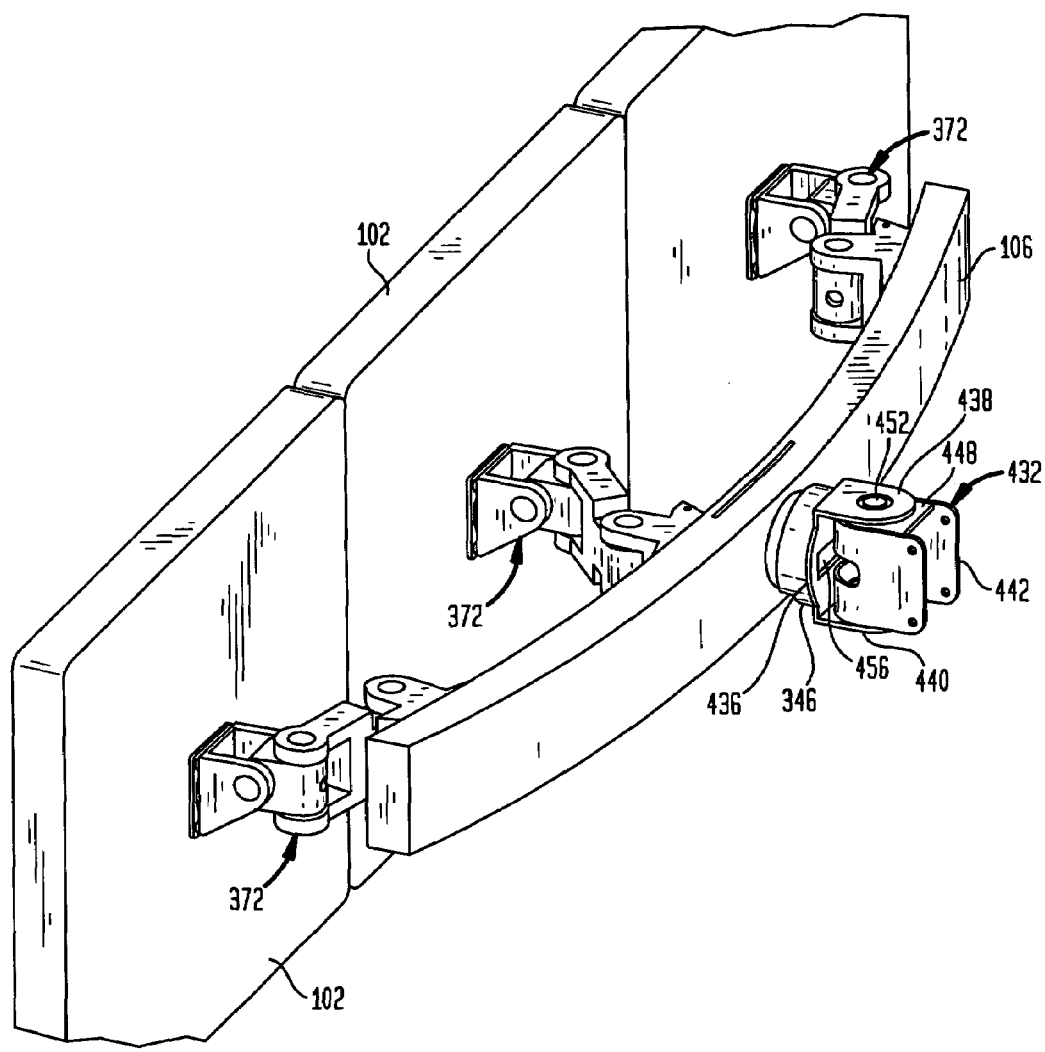
FIG. 23 is a perspective view of a multiple electronic device reorienting support constructed in accordance with another embodiment of the present invention.
Figure 24:
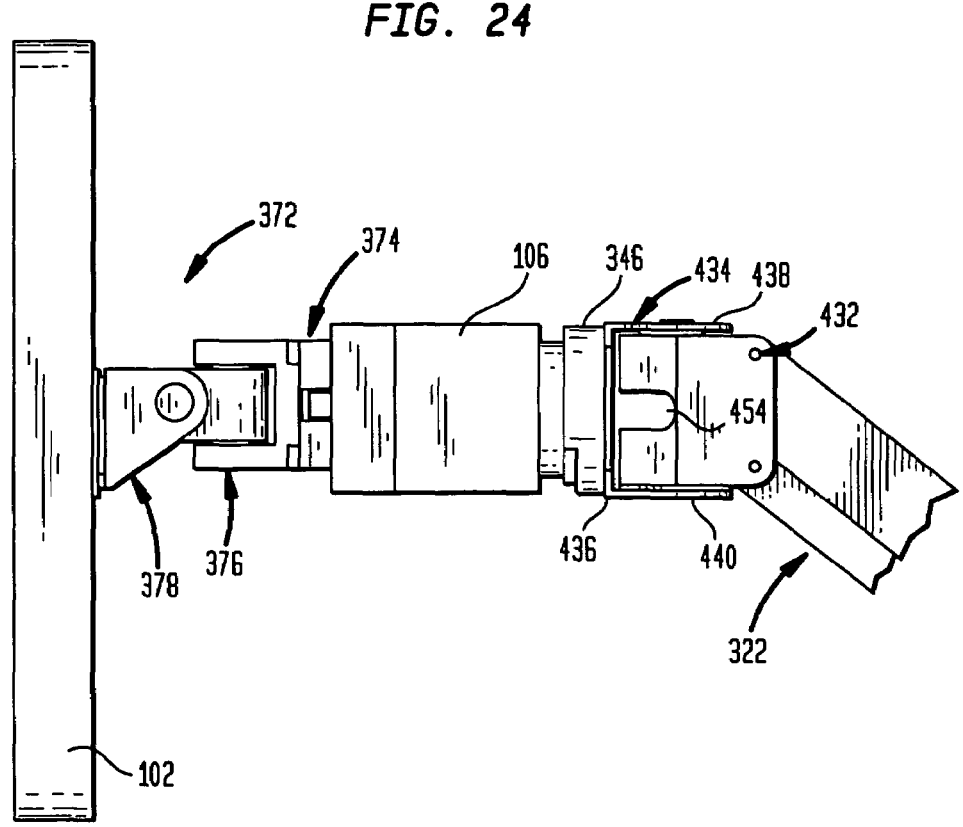
FIG. 24 is a front elevational view of the multiple electronic device reorienting support as shown in FIG. 23.
Figure 25:
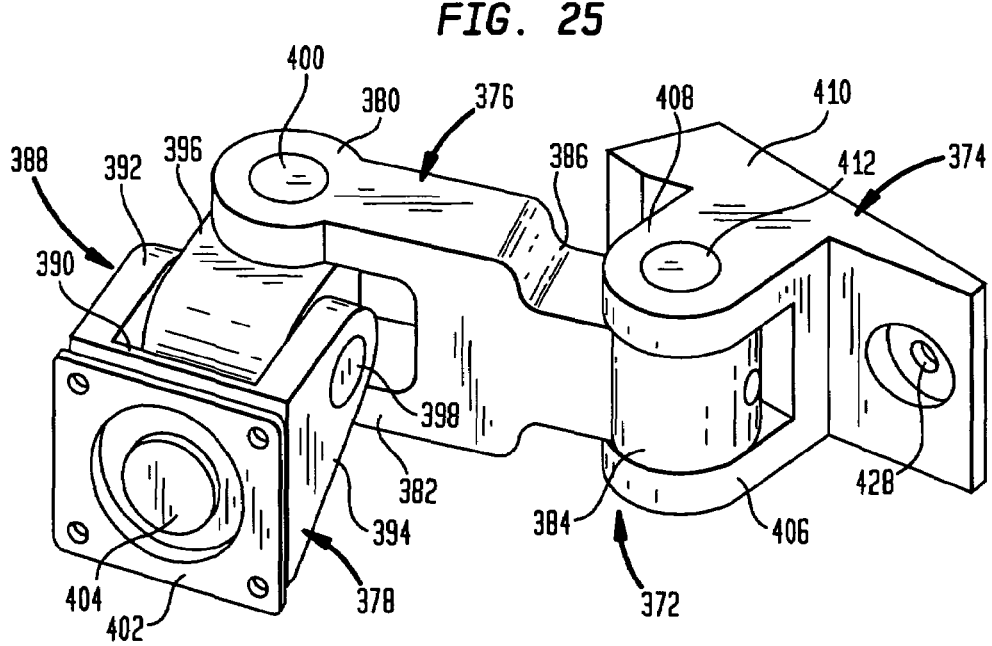
FIG. 25 is a perspective view of a mounting bracket constructed in accordance with another embodiment of the present invention.

Turning to FIGS. 23-25, the displays 102 are adjustably mounted to the switch arm 106 by means of a mounting bracket 372. As best shown in FIG. 25, the mounting bracket includes a mounting plate 374, a yoke 376 and a tilter assembly 378. The yoke 376 includes a u-shaped end formed by a pair of spaced apart legs 380, 382 having aligned openings at their free end. The other end of the yoke 376 includes a cylindrical body 384 through which there extends a circular bore whose longitudinal axis is parallel to the axis extending through the aligned openings within the free ends of the legs 380, 382. The body 384 is connected to the legs 380, 382 by means of an extension member 386.

The tilter assembly 378 includes a u-shaped member 388 formed by a rectangular base 390 from which there extends a pair of spaced apart side arms 392, 394. An opening is formed through the free ends of the side arms 392, 394 arranged in alignment with each other. A tilter support 396 is provided with a pair of transversely arranged cylindrical bores extending therethrough. The tilter support 396 is pivotably coupled to the u-shaped member 388 by means of a cylindrical shaft 398 extending through the aligned openings in the side arms 392, 394 and the bore within the tilter support. In a like manner, the yoke 376 is pivotably coupled to the tilter support 396 by means of a cylindrical shaft 400 extending through the openings within the ends of the legs 380, 382 and the bore within the tilter support. As a result, the yoke, is pivotable about shaft 400, while also being pivotable about shaft 398. An example of a tilter assembly as thus far described is disclosed in U.S. Pat. No. 6,505,988, the disclosure of which is incorporated herein by reference.

A mounting plate 402 is pivotably coupled to the base 390 by means of a central pin 404. The display 102 may be mounted to the mounting plate 402 whereby the display can be rotated about pin 404.

The switch arm mounting plate 374 includes a body having a pair of spaced apart side arms 406, 408 having aligned openings at one end thereof. The side arms 406, 408 extend from a base 410 which is adapted to be slidingly coupled to the switch arm 106. The cylindrical body 384 of the yoke 376 is rotationally coupled between the side arms 406, 408 by means of a received shaft 410 extending through the aligned openings and bore within the cylindrical body. As such, the yoke 376 can be rotated about the axis of the shaft 412.

Figure 26:
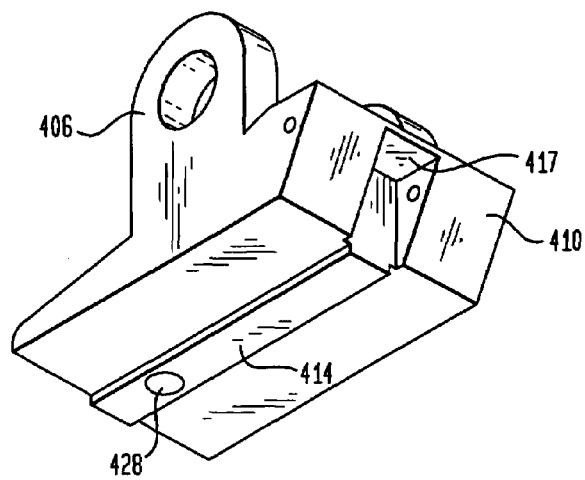
FIG. 26 is a perspective view of a mounting plate forming a portion of the mounting bracket.
Figure 27:
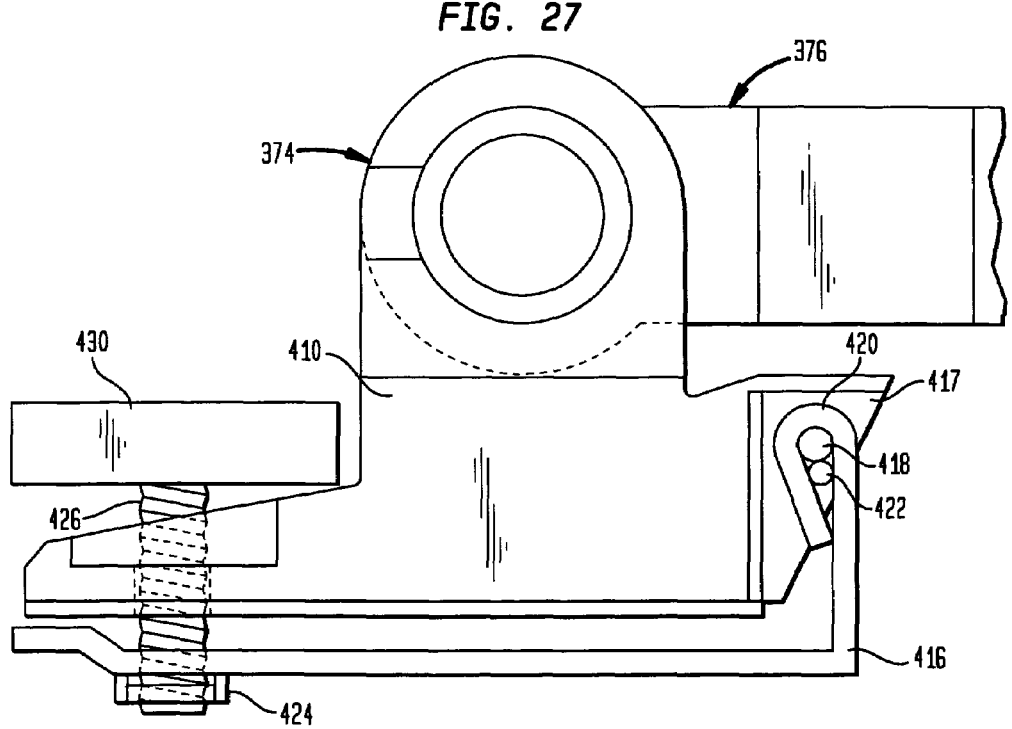
FIG. 27 is an assembled front elevational view of the mounting bracket.

Referring to FIG. 26, the bottom of the base 410 is provided with a projecting elongated rib 414. The rib 414 is dimensioned so as to be received within the slot 182 of the switch arm 106. As shown in FIG. 27, an L-shaped clamping plate 416 is pivotally coupled to one end of the base 410 within a cut-out portion 417 by means of pin 418. The rotational movement is accommodated by the clamping plate 416 having a loop end 420 bent around the pin 418. To facilitate pivotable movement and maintaining of the loop end 420 in proper position, a brass rod 422 is positioned within the loop end 420 underlying the pin 418. The free end of the clamping plate 416 is provided with a threaded fastener 424 which engages a threaded rod 426 which extends through an opening 428 within the base 410. The rod 426 is rotatable by means of a handle 430.

In assembled relationship, the front wall 178 of the switch arm 106 is captured between the clamping plate 416 and the bottom of a base 410 of the mounting plate 374. By rotation of the threaded rod 426, the clamping plate 416 will be brought into pressure contact with the front wall 178 of the switch arm 106, thereby retaining the mounting bracket 372 in fixed location.

Figure 28:
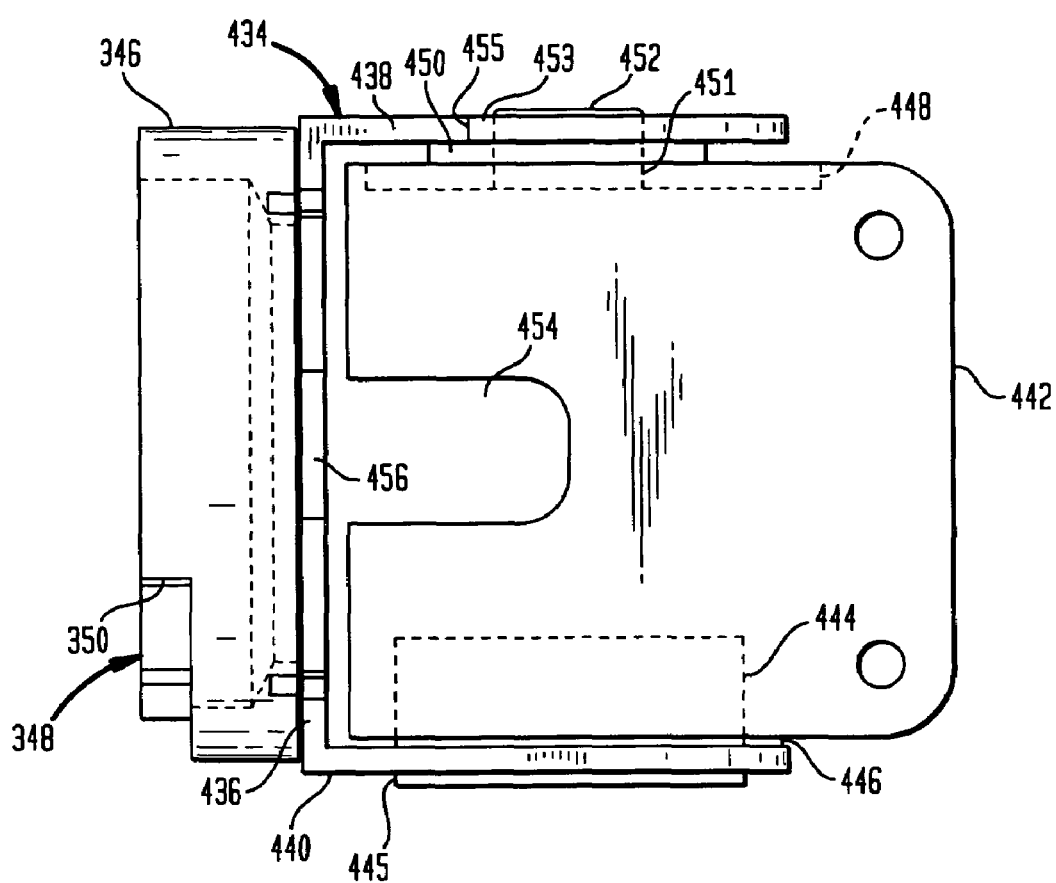
FIG. 28 is a front elevational view of the end cap rotationally coupled to the switch arm.
Figure 29:
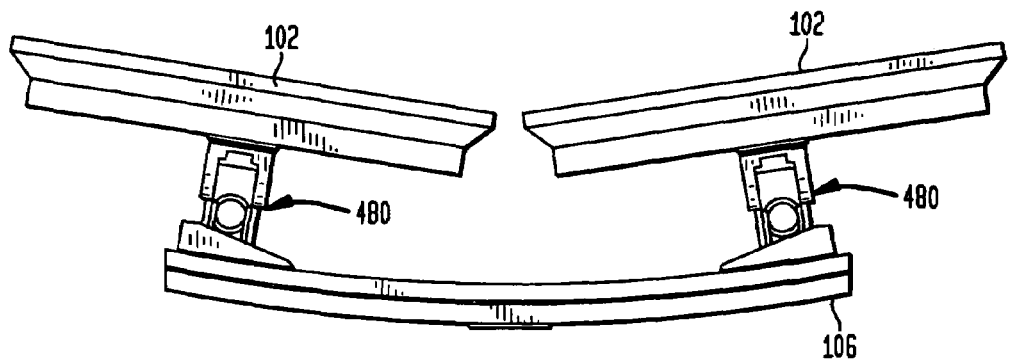
FIG. 29 is a top plan view of a multiple electronic device reorienting support constructed in accordance with another embodiment of the present invention.
Figure 30:
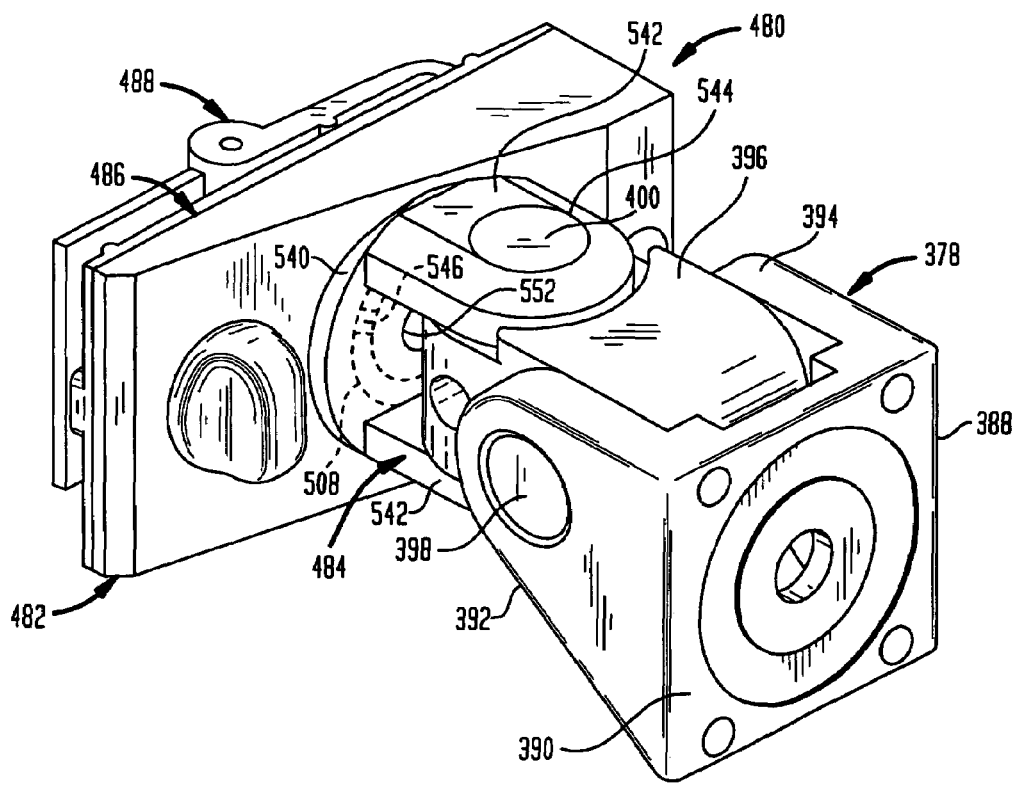
FIG. 30 is a front perspective view of a pivot assembly as shown in FIG. 29 constructed in accordance with another embodiment of the present invention.

The switch arm 106 is rotationally mounted to the extension arm assembly 322 by means of end cap 432 as shown in FIGS. 24 and 28. The end cap 432 includes a u-shaped bracket 434 having a base 436 and a pair of spaced apart side arms 438, 440. The base 436 is provided with a central opening, and the side arms 434, 440 are provided with aligned openings. Bracket 434 is pivotably coupled to the switch arm 106 in the manner as previously described with respect to FIGS. 21 and 22. Briefly, a threaded cylindrical tube 340 is fixably secured to the base 436 to which there is coupled collar 346 for receiving cylindrical tube 344 and bushing 342 as previously described.

A U-shaped bracket 442 is positioned between the side arms 438, 440. As best shown in FIG. 28, side arm 440 is provided with an enlarged opening 445 to which there is affixed a cylindrical sleeve 444. A polymer ring shaped thrust-bearing 446 is supported on the side arm 440 circumscribing the sleeve 444. The thrust-bearing supports the bracket 442 which is rotational about the sleeve 440.

Figure 18:
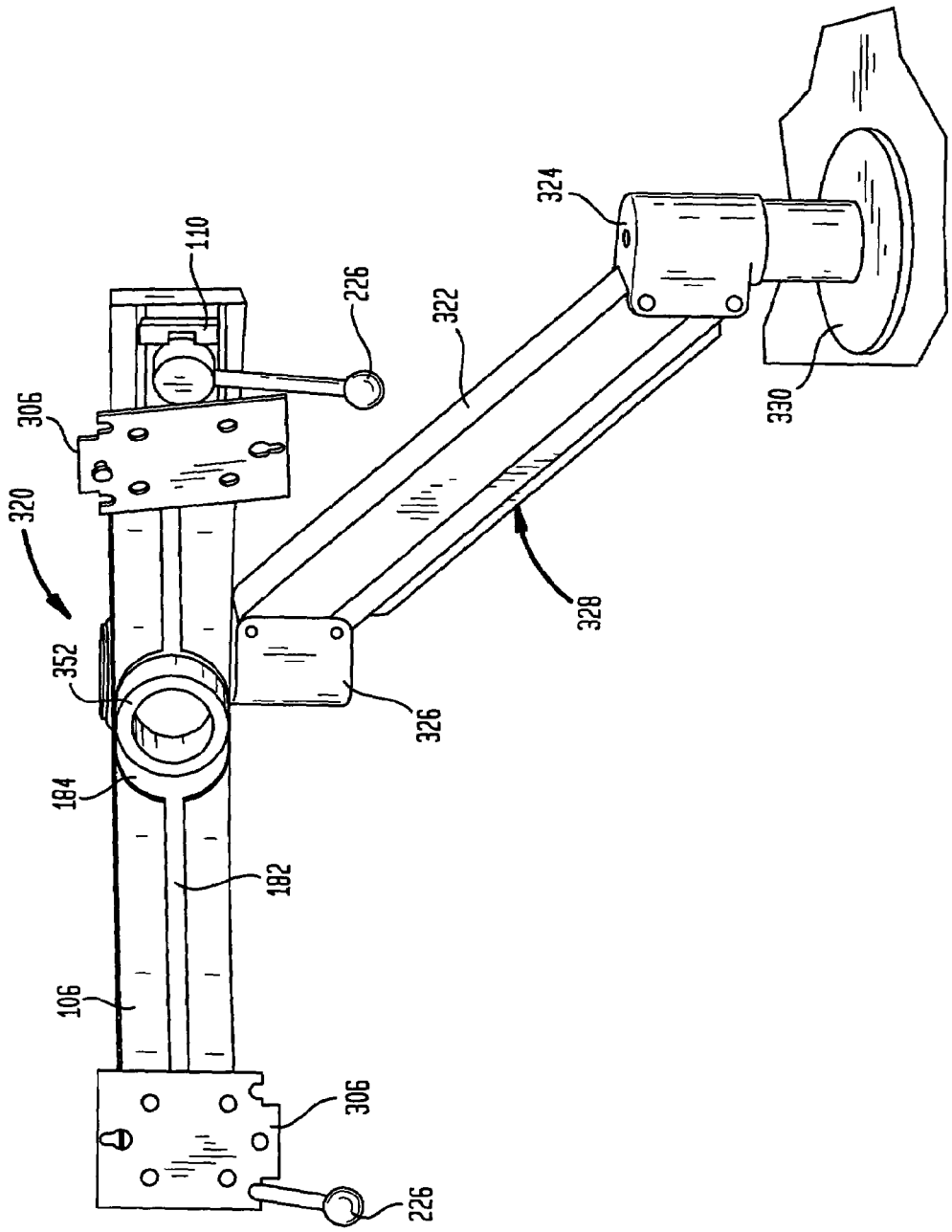
FIG. 18 is a perspective view of the multiple electronic device reorienting support as shown in FIG. 17 with the switch arm positioned in a horizontal orientation.

A plate 448 is secured within the open top of the bracket 442 for supporting a polymer bushing 450 having an opening therethrough in alignment with an opening 451 within the plate 448. The bushing 450 includes a cylindrical portion 453 which extends into the opening 455 within side arm 438. A connecting shaft 452 is received within the bushing 450 and coupled to the plate 448 to allow rotational movement of the bracket 442 thereabout. As shown in FIG. 24, an extension arm assembly 322 is pivotably coupled to the end cap 432. In this regard, the end of the extension arm assembly 322 is received within the open end of the U-shaped bracket 442 and attached thereto by means of pins or the like extending through openings 453. The other end of the extension arm assembly 322 may be coupled to, for example, to end cap 324 as shown in FIG. 18.

A cable passageway is formed through the enlarged opening 445 in side arm 440 extending through sleeve 444 into the interior of bracket 442. An opening 454 is provided within the bracket 442 to allow passage of the cables through an opening 456 in the base 436 of bracket 434, and into the interior of the threaded cylindrical tubes 340. From there, the cables can be fed to the displays 102 through the switch arm 106. The cable passageway may also extend through the extension assembly arm 322. In this regard, the hollow interior of the extension arm assembly 322 is in communication with the interior of the bracket 442 at the location of its pivotable attachment. As such, cables may be fed through the extension arm assembly 322, through the bracket 442, and into the switch arm 106 for connection to the displays 102.

Referring now to FIGS. 29 through 38, there will be described a pivot assembly constructed in accordance with another embodiment of the present invention and generally designated by reference Numeral 480. The pivot assembly 480 is adapted to couple an electronic device such as a flat screen display 102 to the switch arm 106. In accordance with one embodiment, the pivot assembly 480 may be coupled to a tilter assembly 378 as described with respect to FIG. 25.

The pivot assembly 480 generally includes a base 482, a rotatable connecting bracket 484, an intermediate plate 486 and a pivotable plate 488.

Figure 32:
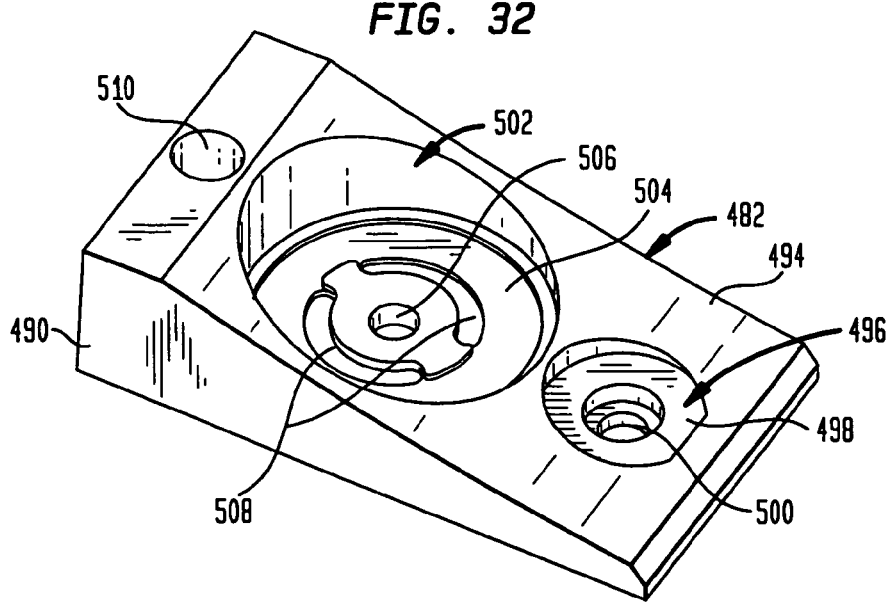
FIG. 32 is a top perspective view of a base for the pivot assembly.

Referring to FIGS. 32 and 33, the base 482 includes a body 490 having a generally planar bottom surface 492 and a sloping generally planar top surface 494. As a result, the base 482 has a generally triangular shape in side view, although other shapes are feasible, for example, rectangular and the like. A circular bore 496 having a bottom wall 498 extends partially through the base 482 from the top surface 494. An opening 500 extends from the bottom wall 498 of the bore 496 through the remaining portion of the base 482 to the bottom surface 492.

A larger centrally positioned bore 502 having a bottom wall 504 also extends partially through the body 490 of the base 482. The bottom wall 504 is provided with a center through hole 506 extending to the bottom surface 492. A pair of circular grooves 580 are formed in the bottom wall 504 circumferentially surrounding a portion through hole 506. The grooves 508 are not required to extend all the way through the body 490. A through hole 510 is provided with an intermediate shelf 512, see FIG. 38, extending through the base 482 adjacent one end thereof adjacent bore 502.

As shown in FIG. 33, the bottom surface 492 of the base 482 is provided with four spaced apart circular alignment recesses 514. A circular recess 516 is formed concentrically around through hole 506. An upstanding boss 518 extends outwardly from the bottom surface 492 of the base 582. The boss 518 is positioned between recess 516 and opening 500. A through hole 520 is formed extending adjacent one corner of the free end of the boss 518.

Figure 35:
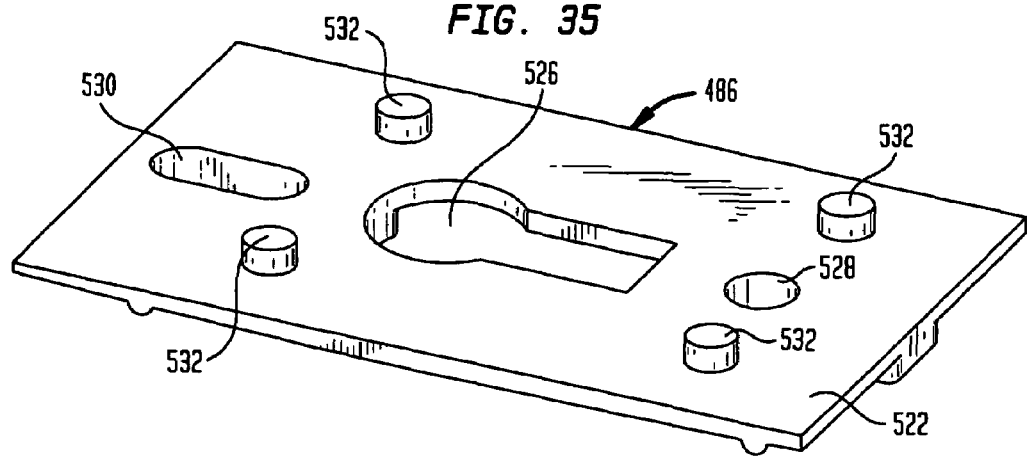
FIG. 35 is a bottom perspective view of the intermediate plate for the pivot assembly.

Referring to FIGS. 34 and 35, the intermediate plate 486 is constructed generally in the nature of a rectangular flat plate having a top surface 522 and a bottom surface 524. The plate 486 is provided with a central keyhole shaped opening 526, a circular through hole 528, and an elongated oval shaped through hole 530. Four circular studs 532 extend upwardly from the top surface 522 of the intermediate plate 486. The studs 532 are arranged in a predetermined pattern so as to align with and be receivable within the alignment recesses 514 within the base 482. A pair of spaced apart parallel arranged ribs 544 are provided on the bottom surface 524 of the intermediate plate 486 adjacent the ends thereof. The ribs 534, as shown, are circular in cross-section. The ribs are centrally intersected by a pair of spaced apart rectangular bosses 536, 538. Through hole 528 extends through boss 536, while the oval shaped through hole 530 extends through boss 538. The bosses 536, 538 extend from adjacent the keyhole-shaped opening 526 to the ends of the intermediate plate 486.

Figure 31:
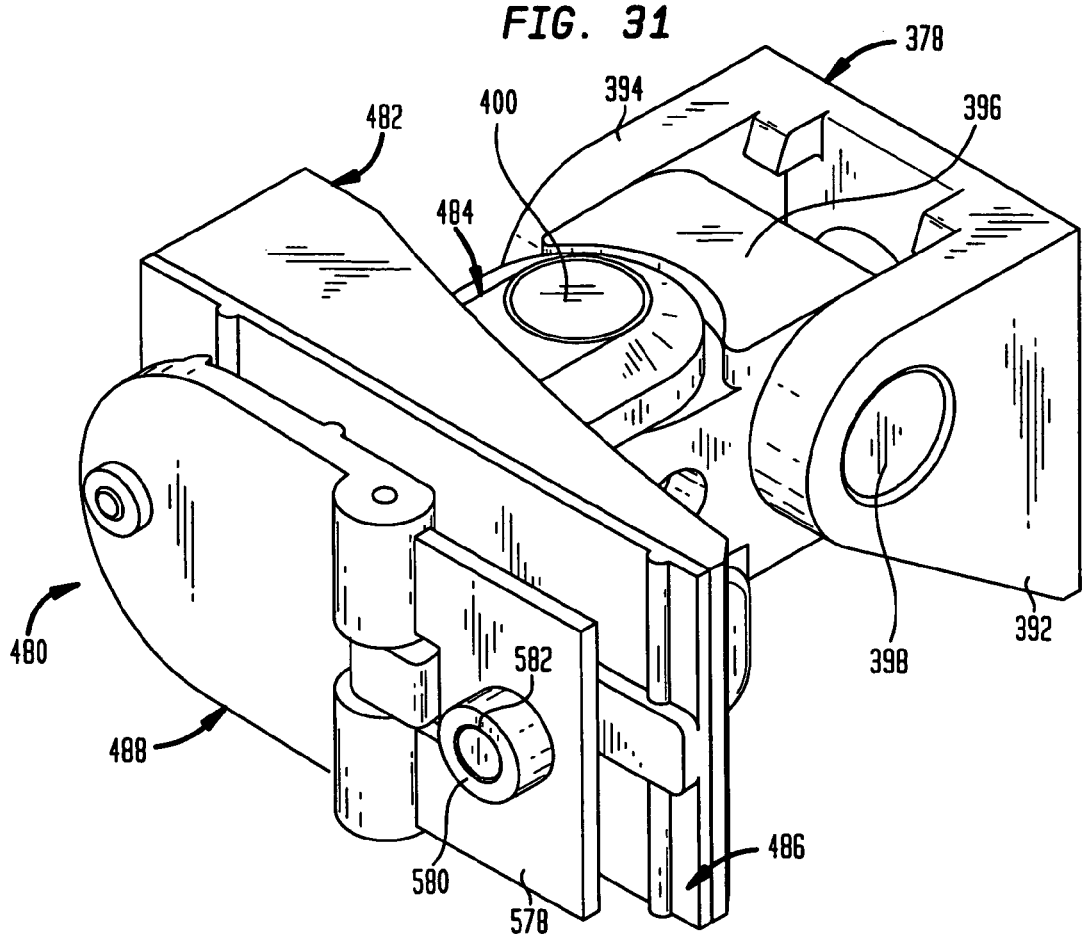
FIG. 31 is rear perspectives view of the pivot assembly as shown in FIG. 30.

The intermediate plate 486 is positioned over the bottom surface 492 of the base 482 as best shown in FIG. 31. The intermediate plate 486 is maintained in position by the studs 532 being received within the alignment recesses 514. The boss 518 will protrude through one end of the keyhole-shaped opening 526, the circular portion being aligned with recess 516 within the bottom surface 492 of the base 482. Through hole 528 will be aligned with opening 500 and oval shaped through hole 530 will be aligned with through hole 510. A shown in FIG. 38, the end of hole 510 opening through the bottom surface 492 of the base 482 is conical shape as to be described hereinafter.

The base 482 is coupled to the tilter assembly 378 by means of a rotatable connecting bracket 484. The connecting bracket 484 has a circular base 540 which is rotationally received within the bore 502 and from which there extends a pair of spaced apart legs 542, see FIG. 30. The legs 542 are provided with an aligned through hole 544 which is operative for receiving shaft 400 about which the tilter support 396 of the tilter assembly 378 pivots as thus far described. In this regard, the free end of the tilter support 396 is received between the spaced apart legs 542 and pivotably secured thereat by means of shaft 400 extending therethrough. The bottom surface of the base 540 of the connecting bracket 484 is provided with a pair of projecting ribs 546, one of which is shown in phantom in FIGS. 30 and 38. Each of the ribs 546 is adapted to be received within one of the grooves 508 within the bottom wall 504 of bore 502.

A flat annular shaped nylon washer 548 may be interposed between the bottom surface of the base 540 of the connecting bracket 484 and the bottom wall 504 of bore 402. With the ribs 546 captured within the grooves 508, the connecting bracket 540 may be rotated, clockwise and counter clockwise, to the extent of the grooves. For example, the length of the grooves 540 may be suitable for rotation of the connecting bracket about 90 degrees in either direction. Longer and shorter grooves 508 are contemplated whereby rotation of the connecting bracket 548 will be either increased or decreased in a corresponding manner. The connecting bracket 548 is rotationally coupled to the base 482 by a threaded bolt 550 which extends through hole 506 in the base 482 and through an aligned opening in the base 540 of the connecting bracket 484. A nut 552 may be attached to the free end of the bolt 550 thereby securing the connecting bracket 484 to the base 482.

Figure 36:
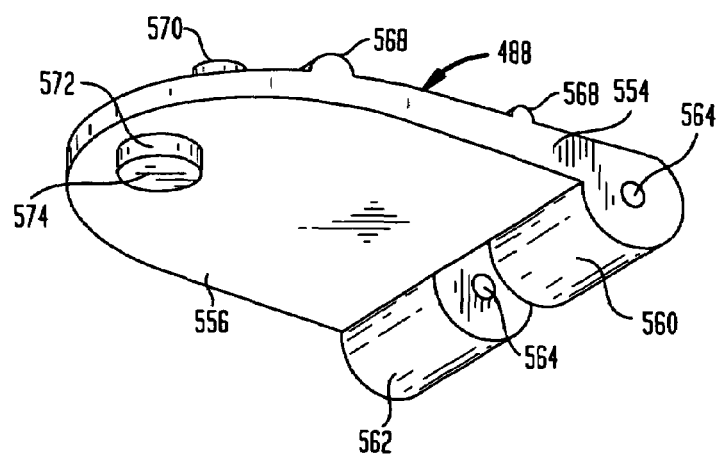
FIG. 36 is a bottom perspective view of a pivotable plate of the pivot assembly.
Figure 37:
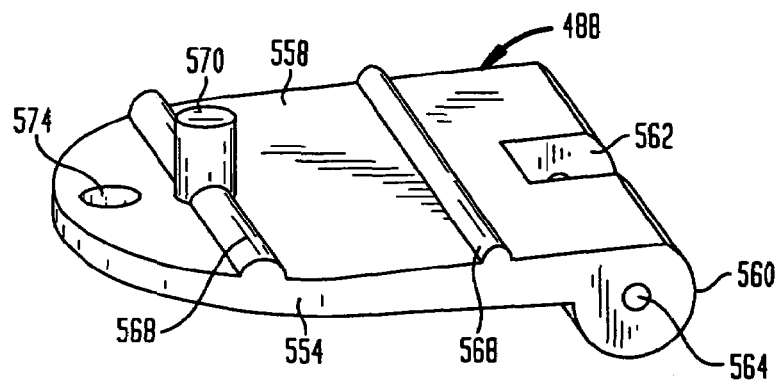
FIG. 37 is a top perspective view of the pivotable plate for the pivot assembly.

The pivotable plate 448, as shown in FIGS. 36 and 37, includes a generally flat plate 554 having a bottom surface 556 and a top surface 558. The plate 554 has a slight tapered cross-section, being thicker at one end than the other. The thicker end is provided with a pair of spaced apart circular bodies 560, 562, having an aligned through hole 564. The circular bodies 560, 562 are spaced apart so as to receive boss 518 therebetween. The plate 488 is pivotably attached to boss 518 by means of a pin 566 extending through holes 564 within the circular bodies 560, 562 and the through hole 520 within boss 518.

A pair of spaced apart elongated ribs having a circular shape are disposed in parallel relationship on the top surface 558 of the pivotable plate 488. A circular boss 570 projects upwardly from the top surface 558 generally intersecting rib 568. A boss 572 projects outwardly from the bottom surface 556 of the pivotable plate 488 adjacent its forward edge. A threaded opening 574 extends through the boss 572 and through plate 554. In accordance with one embodiment, both the intermediate plate 486 and pivotable plate 488 are constructed from suitable polymer materials, such as nylon and the like.

Figure 38:
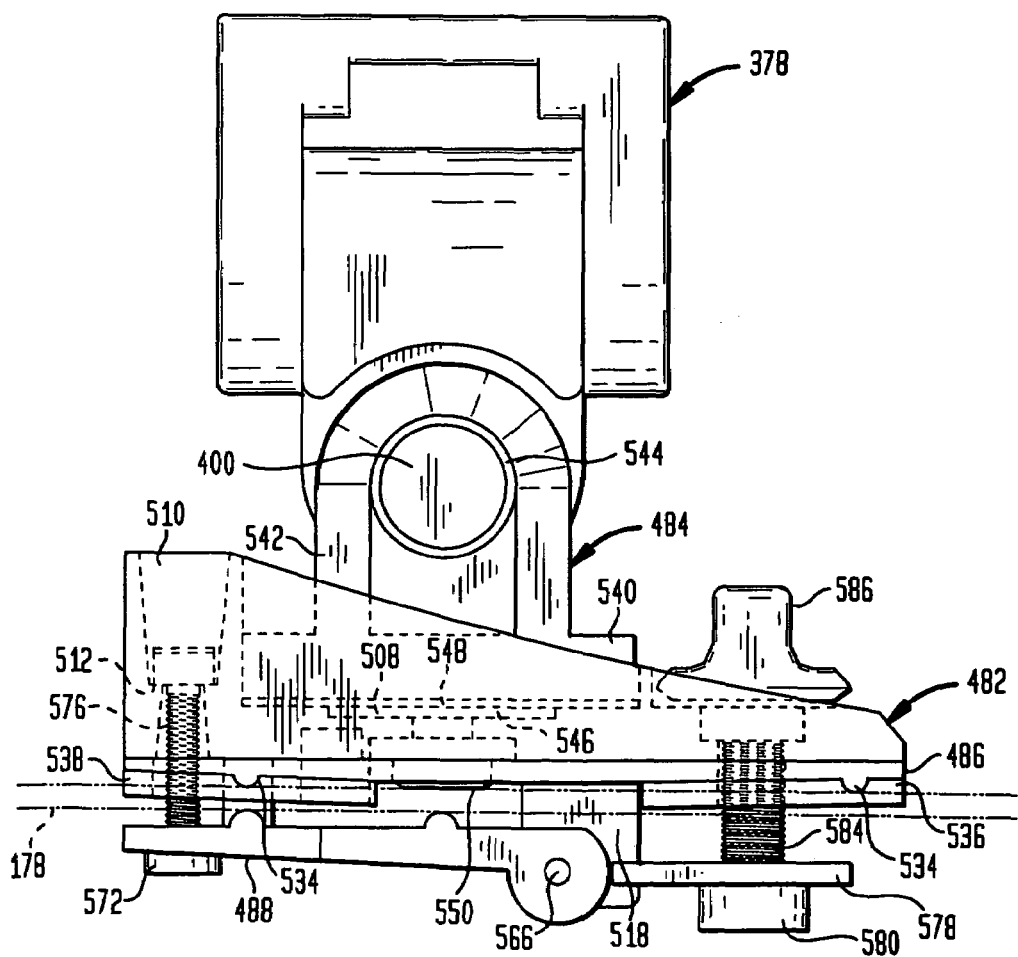
FIG. 38 is a front elevational view of the pivot assembly shown in assembled relationship.

The pivotable assembly 480 is shown in assembled relationship with respect to the switch arm 106 in FIG. 38. As thus far described, the connecting bracket 484 is rotatably secured to the base 482 by means of bolt 550. The intermediate plate 486 is supported on the bottom surface 492 of the base 482 with studs 532 being received within the alignment recesses 514. In this arrangement, rectangular bosses 536, 538 project downwardly so as to be received within the slot 182 extending along the front wall 178 of the switch arm 106. The ribs 534 will slide along the front wall 178 of the switch arm 106. The boss 518 also extends through the slot 182 of the switch arm 106. As a result, the pivotable plate 488 is received within the interior of the switch arm 106 having the ribs 568 engaging the interior surface of the front wall 178. As a result of this construction, the pivot assembly 480 can slide longitudinally along the length of the switch arm 106.

A threaded bolt 576 is received within through hole 510 being supported by shelf 512. The free end of the bolt 576 is threadingly received within the threaded opening 574 within boss 572 of the pivotable plate 488. By rotation of the bolt 576, the pivotable plate 488 will pivot about pin 566 forcing the ribs 568 into compression engagement against the inner surface of the front wall 178 of the swivel arm 106. As the pivotable plate 488 pivots, the bolt 576 will be displaced slightly laterally to accommodate the pivoting action. This displacement is accommodated by the cone shape of the through hole 510 and the oval shaped hole 530 within the intermediate plate 486. In accordance with this construction, the exterior and interior surfaces of the front wall 178 are contacted by the pivot assembly 480 by means of the four ribs 534, 568.

It is contemplated that it is might be possible to slide the pivot assembly 480 along the swivel arm 106 even when the intermediate plate 486 and the pivotable plate 480 are operatively engaged with the front wall 178 of the switch arm 106. To enhance the locking of the pivot assembly 480 in fixed position to the switch arm 106, there may be further provided a flat plate 578 which supports a boss 580 having a threaded opening extending therethrough. A threaded bolt 584 having an attached knob 586 extends through opening 500 within the base 482 into threaded engagement with boss 580. As the bolt 584 is rotated via knob 586, the plate 578 will be compressed against the inner surface of the front wall 178. The plate 578 can be constructed of suitable plastic material such as nylon. To enhance the locking effect, the front surface of the plate 578 may provided with a rubber pad which will contact the inner surface of the front wall 178 of the swivel arm 106.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus adapted for positioning an electronic device in a plurality of orientations, said apparatus comprising a first member having first and second spaced apart ends, said first end of said first member coupled to a support; an elongated second member having first and second spaced apart ends pivotably coupled midway therebetween to said first member at a pivot point such that the distance between said pivot point and said first end of said second member is substantially equal to the distance between said pivot point and said second end of said second member, said second member rotatable about said pivot point between a vertical and a horizontal orientation; a first coupling assembly attached to said second member adapted for securing an electronic device thereto, said first coupling assembly moveable along said second member between at least said first end of said second member and said pivot point; and a second coupling assembly attached to said second member adapted for securing another electronic device thereto, said second coupling assembly moveable along said second member between at least said second end of said second member and said pivot point, wherein said second member comprises an arm having a front wall provided with an elongated slot therein extending between said first and second ends thereof, said first coupling assembly moveably coupled to said front wall with a portion of said first coupling assembly extending through said slot.

2. The apparatus of claim 1, wherein said first coupling assembly includes a first element received within said arm underlying said front wall of said arm and a second element overlying said front wall of said arm, whereby said first coupling assembly is restricted from movement along said arm upon engagement of said front wall between said first and second elements.

3. The apparatus of claim 2, further including means for compressing said first and second elements against said front wall of said arm.

4. The apparatus of claim 1, wherein said first member comprises an arm stand having an elongated opening.

5. The apparatus of claim 4, further including a pivot assembly within said elongated opening for rotationally coupling said second member to said arm stand.

6. The apparatus of claim 5, wherein said second member is moveable in a vertical direction along a portion of said arm stand when at least in a horizontal orientation.

7. The apparatus of claim 6, further including means for maintaining the position of said second member relative to said arm stand.

8. The apparatus of claim 7, wherein said means comprises a plurality of steps provided on said arm stand adapted for cooperatively engaging with a portion of said pivot assembly.

9. The apparatus of claim 1, further including a tilter assembly adapted for coupling said first coupling assembly to the electronic device.

10. The apparatus of claim 9, further including a yoke pivotably coupling said tilter assembly to said first coupling assembly, said yoke having a first end pivotably coupled to said tilter assembly and a second end pivotably coupled to said first coupling assembly.

11. The apparatus of claim 1, wherein said first member comprises an extension arm assembly.

12. The apparatus of claim 11, wherein said extension arm assembly comprises an adjustable parallelogram channel assembly having first and second ends, a first end cap attached to said first end of said channel assembly and a second end cap attached to said second end of said channel assembly, said first end cap adapted to couple said channel assembly to a support and said second end cap coupling said channel assembly to said second member, said second end cap arrangeable in a plurality of vertical and horizontal orientations.

13. An apparatus for positioning a plurality of electronic devices in a plurality of orientations, said apparatus comprising an extension arm assembly having first and second spaced apart ends, said first end of said extension arm assembly adapted to be coupled to a supporting surface whereby said second end is arrangeable in a plurality of vertical and horizontal orientations; an elongated member having first and second spaced apart ends pivotably coupled therebetween to said second end of said extension arm assembly at a pivot point such that the distance between said pivot point and said first end of said elongated member is substantially equal to the distance between said pivot point and said second end of said elongated member, said member rotatable about the pivot point between a vertical and a horizontal orientation, said member moveable in vertical and horizontal directions upon corresponding movement of said second end of said extension arm assembly; first and second coupling assemblies attached to said member each adapted for securing an electronic device thereto, each of said first and second coupling assemblies moveable along a portion of said member between the pivot point and an adjacent first and second end of said member, wherein said member comprises a hollow arm having a front wall provided with an elongated slot therein extending between said first and second ends thereof, said first and second coupling assemblies moveably coupled to said front wall with a portion of said first and second coupling assemblies extending through said slot.

14. The apparatus of claim 13, wherein said first and second coupling assemblies each include a first element received within said arm underlying said front wall of said arm and a second element overlying said front wall of said arm, whereby said first and second coupling assemblies are restricted from movement along said arm upon engagement of said front wall between said first and second elements.

15. The apparatus of claim 14, further including means for compressing said first and second elements against said front wall of said arm.

16. The apparatus of claim 13, further including a pivot assembly rotationally coupling said member to said second end of said extension arm assembly.

17. The apparatus of claim 13, further including a tilter assembly adapted for coupling said first coupling assembly to an electronic device.

18. The apparatus of claim 17, further including a yoke pivotably coupling said tilter assembly to said first coupling assembly, said yoke having a first end pivotably coupled to said tilter assembly and a second end pivotably coupled to said first coupling assembly.

19. The apparatus of claim 13, wherein said extension arm assembly comprises an adjustable parallelogram channel assembly having first and second ends, a first end cap attached to said first end of said channel assembly and a second end cap attached to said second end of said channel assembly, said first end cap adapted to couple said channel assembly to a supporting surface and said second end cap coupling said channel assembly to said member, said second end cap arrangeable in a plurality of vertical and horizontal orientations.

20. The apparatus of claim 19, further including a pivot assembly rotationally coupling said member to said second end cap.

21. The apparatus of claim 13, further including an electronic device attached to said first and second coupling assemblies.

22. The apparatus of claim 21, wherein said electronic device comprises a flat screen display.

23. The apparatus of claim 13, wherein said first and second coupling assemblies each include a rotatable ball adapted for attachment to an electronic display.

24. An apparatus adapted for positioning an electronic device in a plurality of orientations, said apparatus comprising a first member having first and second spaced apart ends, said first end of said first member adapted to be coupled to a support; an elongated second member having first and second spaced apart ends pivotably coupled therebetween to said first member at a pivot point such that the distance between said pivot point and said first end of said second member is substantially equal to the distance between said pivot point and said second end of said second member, said second member rotatable about said pivot point between a vertical and a horizontal orientation; and means attached to said second member for coupling an electronic device thereto, said means being movable along said second member between at least said first end of said second member and said pivot point.

25. The apparatus of claim 24, wherein said second member comprises an arm having a front wall provided with an elongated slot extending between said first and second ends thereof, said means moveable relative to said front wall along said slot.

26. The apparatus of claim 25, wherein said means includes a first element received within said arm underlying said front wall of said arm and a second element overlying said front wall of said arm, whereby said means is restricted from movement along said arm upon engagement of said front wall between said first and second elements.

27. The apparatus of claim 26, further including means for compressing said first and second elements against said front wall of said arm.

28. The apparatus of claim 24, wherein said means is moveable along said second member between said first and second ends of said second member.

29. The apparatus of claim 24, wherein said second member is moveable in a vertical direction along a portion of said first member when at least in a horizontal orientation.

30. The apparatus of claim 29, further including means for maintaining the position of said second member relative to said first member.

31. The apparatus of claim 24, wherein said first member comprises an extension arm assembly.

32. An apparatus adapted for positioning an electronic device in a plurality of orientations, said apparatus comprising a first member having first and second spaced apart ends, said first end of said first member adapted to be coupled to a support; an elongated second member having first and second spaced apart ends pivotably coupled midway therebetween to said first member at a pivot point such that the distance between said pivot point and said first end of said second member is substantially equal to the distance between said pivot point and said second end of said second member, said second member comprising an arm having a front wall provided with an elongated slot extending between said first and second ends thereof, said second member rotatable about said pivot point between a vertical and a horizontal orientation; and first and second mounting devices coupled to said front wall of said second member each having a portion thereof extending within said slot, said mounting devices adapted for mounting an electronic device thereto, each of said mounting devices moveable along said slot between one of said first and second ends of said second member and said pivot point.

33. The apparatus of claim 32, wherein each of said mounting devices includes a first element received within said arm underlying said front wall of said arm, a second element overlying said front wall of said arm, and a third element connecting said first and second elements together, said third element extending through said slot, whereby each of said mounting devices is restricted from movement along said arm upon engagement of said front wall between said first and second elements.

34. The apparatus of claim 33, wherein said third element is operative for compressing said first and second elements against said front wall of said arm.

35. The apparatus of claim 32, wherein said second member is moveable in a vertical direction along a portion of said first member when at least in a horizontal orientation.

36. The apparatus of claim 35, further including means for maintaining the position of said second member relative to said first member.

37. An apparatus adapted for positioning an electronic device in a plurality of orientations, said apparatus comprising a first member having first and second spaced apart ends, said first end of said first member adapted to be coupled to a support; an elongated second member having first and second spaced apart ends, said second member including means for pivotably coupling said second member to said first member midway between said spaced apart ends of said second member at a pivot point such that the distance between said pivot point and said first end of said second member is substantially equal to the distance between said pivot point and said second end of said second member, said second member comprising an arm having a front wall provided with an elongated slot extending between said first and second ends thereof, said second member rotatable about said pivot point between a vertical and a horizontal orientation; and a pair of mounting devices coupled to said front wall of said second member relative to said slot, said mounting devices adapted for mounting an electronic device thereto, each of said mounting devices moveable along said slot between one of said first and second ends of said second member and said pivot point, said mounting device comprising a first element received within said arm underlying said front wall of said arm, a second element overlying said front wall of said arm, and a third element connecting said first and second elements together, said third element extending through said slot, and a connecting bracket having one end rotationally coupled to said second member and another end adapted to be coupled to an electronic device, whereby said mounting device is restricted from movement along said arm upon engagement of said front wall between said first and second elements.

38. The apparatus of claim 37, wherein said connecting bracket comprises a base rotationally coupled to said second member and a pair of spaced apart legs.

39. The apparatus of claim 38, further including a tilter assembly coupled to said connecting bracket.

40. The apparatus of claim 39, wherein said legs each include an opening for receiving a shaft extending between said legs, said tilter having a portion thereof rotationally coupled to said shaft between said legs.

41. The apparatus of claims 37, wherein each of said mounting devices further includes means for compressing said first and second elements against said front wall of said arm.

* * * * *